(12) United States Patent
Terauchi et al.

(10) Patent No.: US 11,012,633 B2
(45) Date of Patent: May 18, 2021

(54) IMAGE CAPTURING APPARATUS, IMAGE CAPTURING METHOD, AND IMAGE PROCESSING APPARATUS

(71) Applicants: Masakazu Terauchi, Tokyo (JP); Hiroyasu Uehara, Tokyo (JP); Masashi Miyata, Tokyo (JP); Hiroshi Kano, Tokyo (JP); Takeyoshi Nishimura, Tokyo (JP)

(72) Inventors: Masakazu Terauchi, Tokyo (JP); Hiroyasu Uehara, Tokyo (JP); Masashi Miyata, Tokyo (JP); Hiroshi Kano, Tokyo (JP); Takeyoshi Nishimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 37 days.

(21) Appl. No.: 16/358,923

(22) Filed: Mar. 20, 2019

(65) Prior Publication Data

US 2019/0297242 A1    Sep. 26, 2019

(30) Foreign Application Priority Data

Mar. 22, 2018  (JP) ............................. JP2018-054060
Feb. 8, 2019  (JP) ................................. 2019-021125

(51) Int. Cl.
*H04N 5/235* (2006.01)
*H04N 5/349* (2011.01)
(Continued)

(52) U.S. Cl.
CPC ......... *H04N 5/2355* (2013.01); *H04N 5/2351* (2013.01); *H04N 5/2353* (2013.01);
(Continued)

(58) Field of Classification Search
CPC ........... H04N 5/23232; H04N 5/23267; H04N 5/23287; H04N 5/2351; H04N 5/2353;
(Continued)

(56) References Cited

U.S. PATENT DOCUMENTS 5,162,914 A   11/1992  Takahashi et al.
6,426,773 B1   7/2002  Suzuki
(Continued)

FOREIGN PATENT DOCUMENTS

JP   H01-060156    3/1989
JP   H10-336686   12/1998
(Continued)

*Primary Examiner* — Lin Ye
*Assistant Examiner* — Chriss S Yoder, III
(74) *Attorney, Agent, or Firm* — IPUSA, PLLC

(57) ABSTRACT

An image capturing apparatus includes an image data acquirer configured to acquire pieces of image data at a plurality of relative movement positions to which an imaging surface of an imaging sensor is relatively moved with respect to an object light flux; an exposure changer configured to change an exposure when acquiring the pieces of image data at the plurality of relative movement positions; a dynamic range adjuster configured to adjust a dynamic range of the acquired pieces of image data; and an image data combiner configured to obtain composite image data of the pieces of image data, based on a positional shift amount between the pieces of image data and the dynamic range.

11 Claims, 24 Drawing Sheets

(51) Int. Cl.
*H04N 5/232* (2006.01)
*H04N 5/367* (2011.01)

(52) U.S. Cl.
CPC ..... *H04N 5/23232* (2013.01); *H04N 5/23267* (2013.01); *H04N 5/23287* (2013.01); *H04N 5/349* (2013.01); *H04N 5/367* (2013.01)

(58) Field of Classification Search
CPC ...... H04N 5/2355; H04N 5/238; H04N 5/349; H04N 5/367; H04N 9/04557
See application file for complete search history.

(56) References Cited

U.S. PATENT DOCUMENTS

| | | | | |
|---|---|---|---|---|
| 7,411,626 | B2* | 8/2008 | Ueda | H04N 9/045 348/364 |
| 8,300,095 | B2* | 10/2012 | Ogihara | G03B 17/48 348/222.1 |
| 8,798,395 | B2* | 8/2014 | Jo | H04N 5/35581 382/284 |
| 10,043,253 | B2* | 8/2018 | Kimura | G06T 5/008 |
| 10,136,079 | B2 | 11/2018 | Terauchi et al. | |
| 2017/0048443 | A1* | 2/2017 | Tokui | H04N 5/2355 |
| 2017/0155818 | A1* | 6/2017 | Bonnet | G02B 27/106 |

FOREIGN PATENT DOCUMENTS

| | | |
|---|---|---|
| JP | 2015-226135 | 12/2015 |
| JP | 2016-010008 | 1/2016 |
| JP | 2016-058771 | 4/2016 |
| JP | 2018-007083 | 1/2018 |

\* cited by examiner

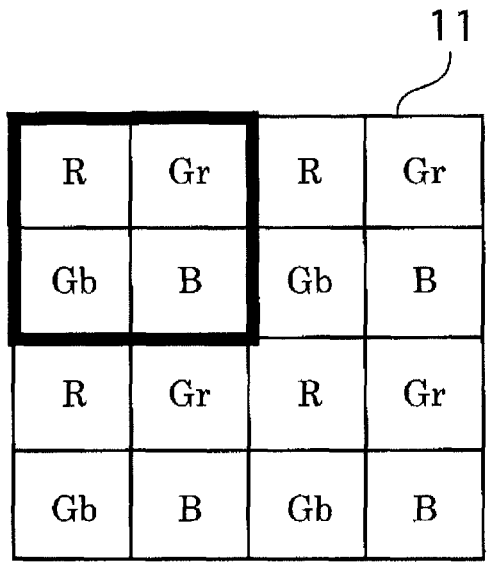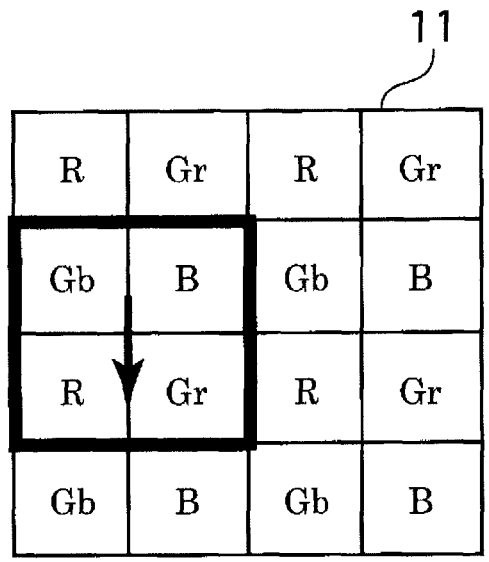
FIG.2A  FIG.2B
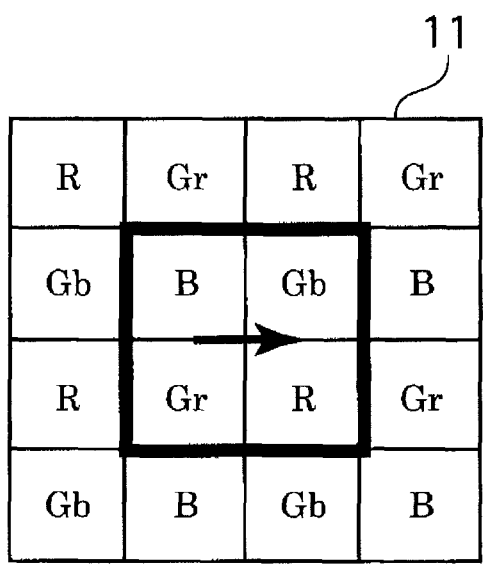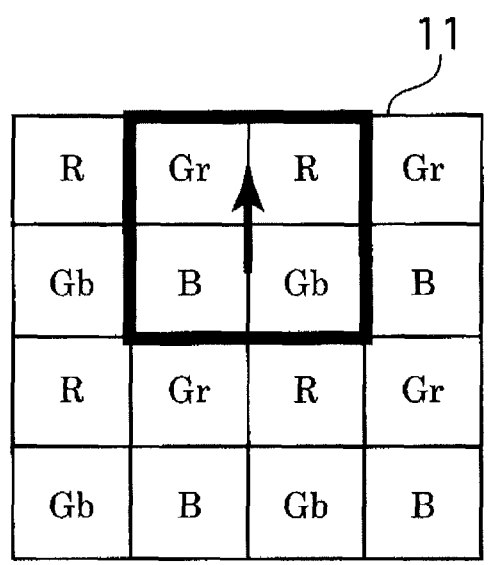
FIG.2C  FIG.2D

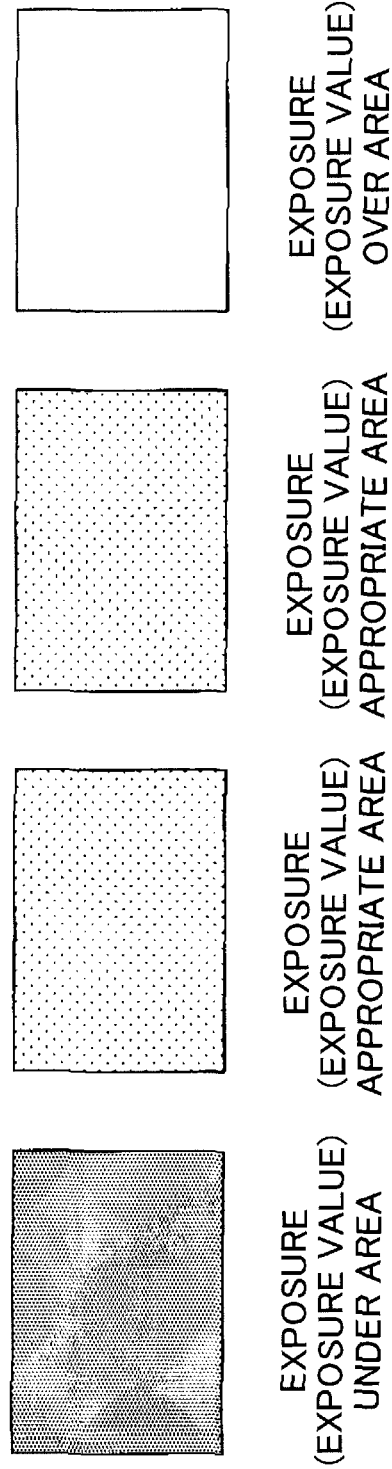

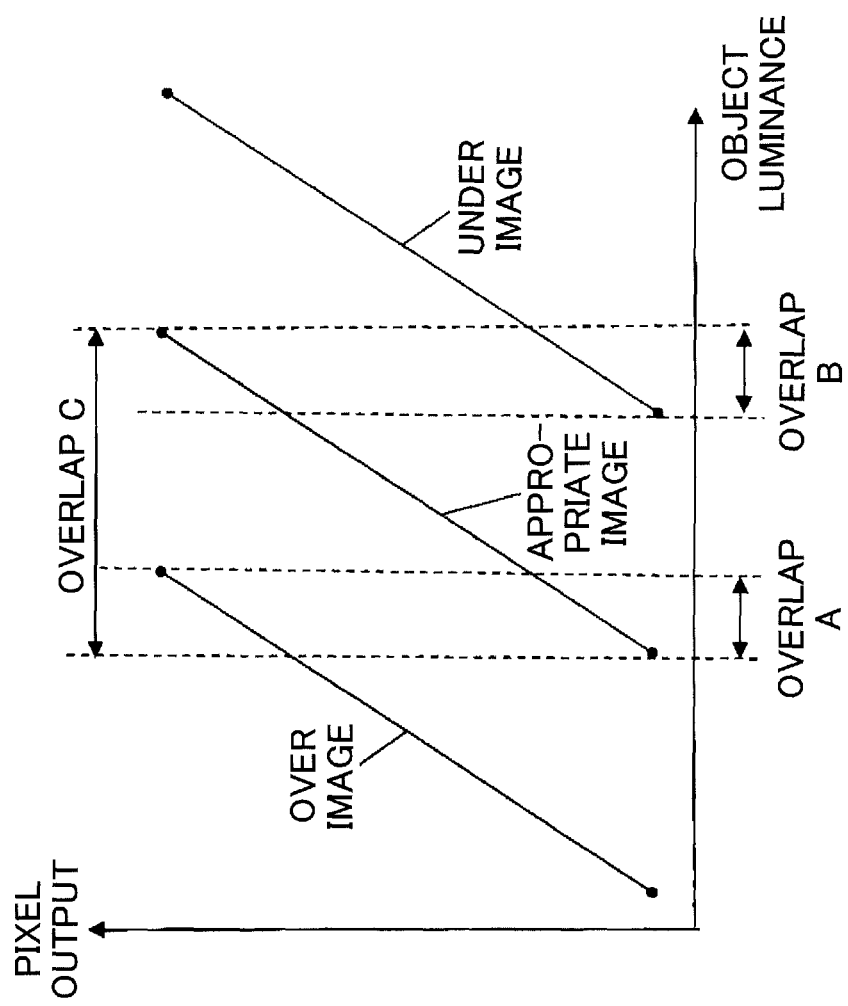

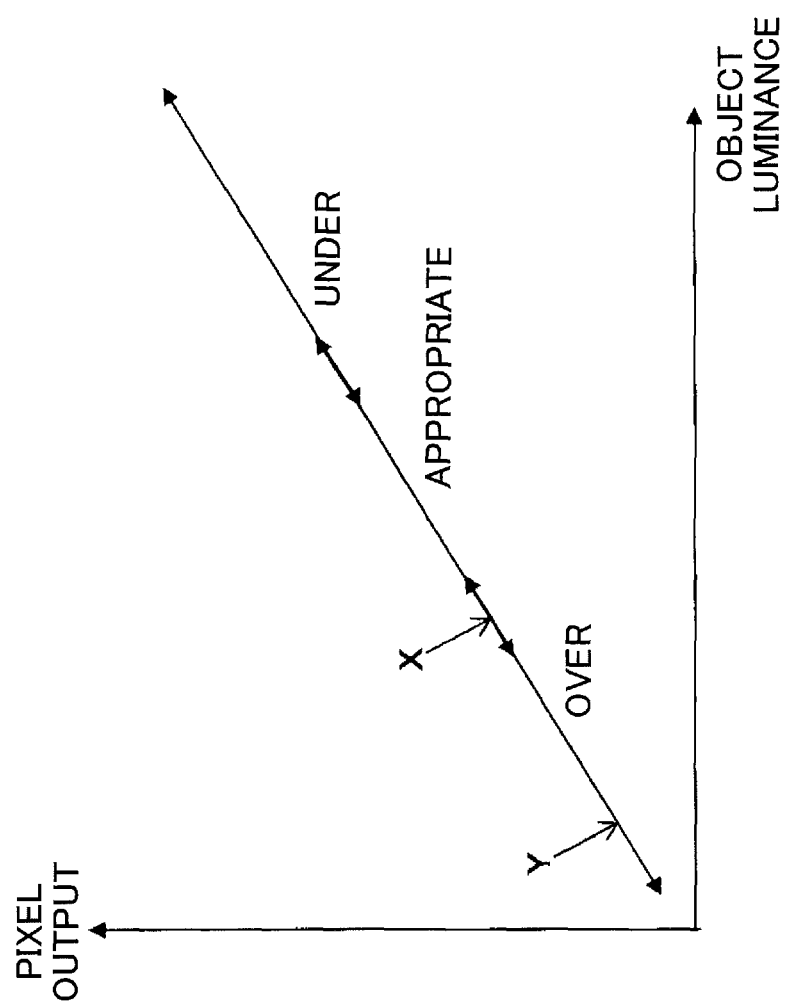

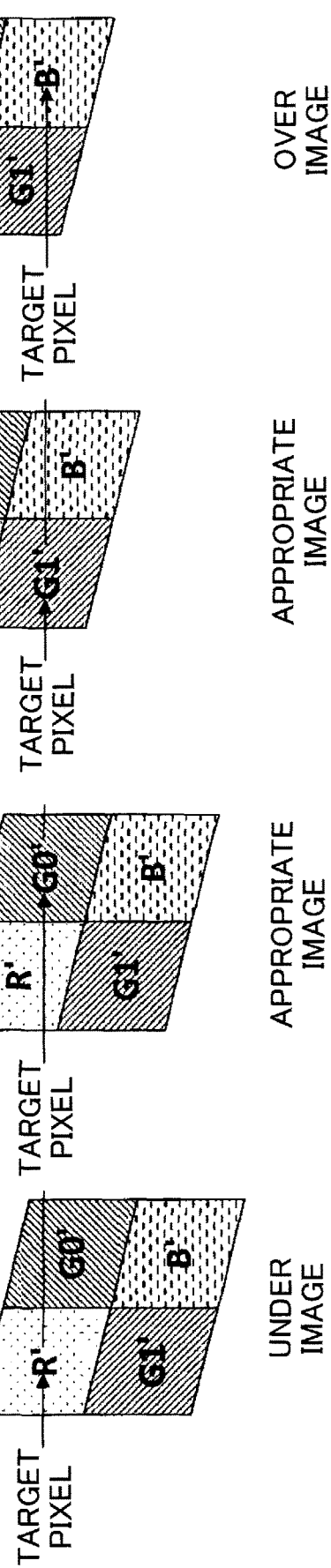

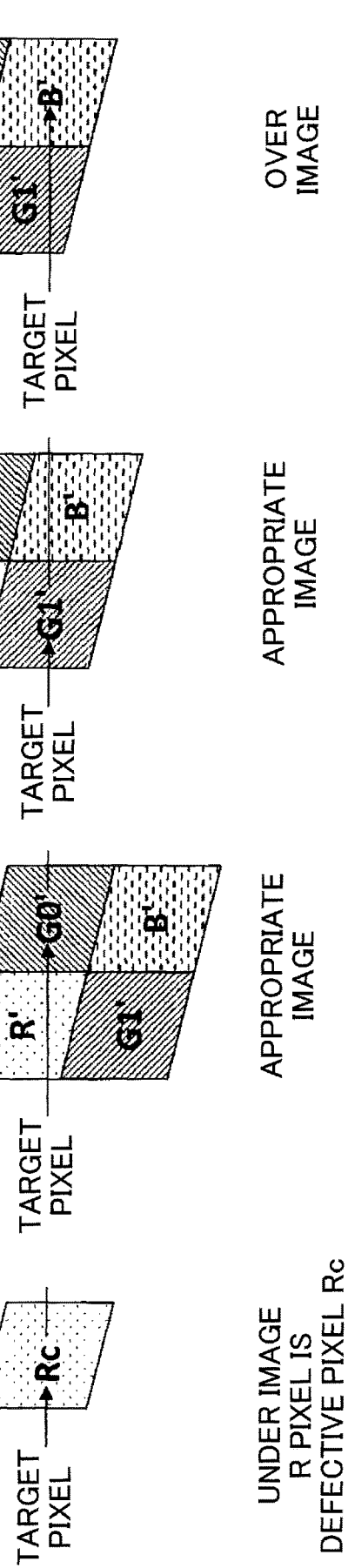

$$x_R = R_4$$
$$x_G = \frac{G_3 + G_5 + G_6 + G_7}{4}$$
$$x_B = \frac{B_0 + B_1 + B_2 + B_3}{4}$$

PIXEL OUTPUT $X'_R, X'_G, X'_B$ CORRESPONDING TO AFTER DYNAMIC RANGE ADJUSTMENT IS OBTAINED, BASED ON PIXEL OUTPUT $X_R, X_G, X_B$ CORRESPONDING TO BEFORE DYNAMIC RANGE ADJUSTMENT

FIRST IMAGE

| 1-1 | 1-2 | ... | ... |
| --- | --- | --- | --- |
| ... | ... | ... | ... |
| ... | ... | ... | ... |
| ... | ... | ... | 1-N |

FIG.16A

SECOND IMAGE

| 2-1 | 2-2 | ... | ... |
| --- | --- | --- | --- |
| ... | ... | ... | ... |
| ... | ... | ... | ... |
| ... | ... | ... | 2-N |

FIG.16B

THIRD IMAGE

| 3-1 | 3-2 | ... | ... |
| --- | --- | --- | --- |
| ... | ... | ... | ... |
| ... | ... | ... | ... |
| ... | ... | ... | 3-N |

FIG.16C

FOURTH IMAGE

| 4-1 | 4-2 | ... | ... |
| --- | --- | --- | --- |
| ... | ... | ... | ... |
| ... | ... | ... | ... |
| ... | ... | ... | 4-N |

FIG.16D

IMAGE CAPTURING APPARATUS, IMAGE CAPTURING METHOD, AND IMAGE PROCESSING APPARATUS

CROSS-REFERENCE TO RELATED APPLICATION

The present application is based on and claims priority under 35 U.S.C. § 119 to Japanese Patent Application No. 2018-054060, filed on Mar. 22, 2018, and Japanese Patent Application No. 2019-021125, filed on Feb. 8, 2019, the contents of which are incorporated herein by reference in their entirety.

BACKGROUND OF THE INVENTION

1. Field of the Invention

The present invention relates to an image capturing apparatus, an image capturing method, and an image processing apparatus.

2. Description of the Related Art

Patent Document 1 discloses an image capturing apparatus that relatively shifts an optical input means and an image capturing means for optically inputting an object image. Based on a plurality of pieces of color image information of the same object obtained by the shifting, color image information corresponding to one screen is obtained with a certain color, and then, based on the color image information of the certain color, color image information for one screen is obtained. Accordingly, it is possible to prevent the occurrence of pseudo color and camera shake, and to obtain high definition (high image quality, high accuracy) images.

Patent Document 2 discloses an imaging apparatus including a first imaging mode of forming video signals by repeating light accumulation for n seconds, and a second imaging mode of alternately performing light accumulation of n seconds and light accumulation of m (<n) seconds, and combining the n second accumulated images and the m second accumulated images, to form video signals of one screen. By the n-second accumulated images in the regular first imaging mode, control is implemented to form switching signals for switching between the first and second imaging modes, and n-second accumulated images in the second imaging mode and pixel composite control signals of the n-second accumulated images, thereby substantially enlarging the dynamic range.

Patent Document 1: Japanese Unexamined Patent Application Publication No. H10-336686
Patent Document 2: Japanese Unexamined Patent Application Publication No. H01-060156

SUMMARY OF THE INVENTION

An aspect of the present invention provides an image capturing apparatus, an image capturing method, and an image processing apparatus in which one or more of the disadvantages of the related art are reduced.

According to one aspect of the present invention, there is provided an image capturing apparatus including an image data acquirer configured to acquire pieces of image data at a plurality of relative movement positions to which an imaging surface of an imaging sensor is relatively moved with respect to an object light flux; an exposure changer configured to change an exposure when acquiring the pieces of image data at the plurality of relative movement positions; a dynamic range adjuster configured to adjust a dynamic range of the acquired pieces of image data; and an image data combiner configured to obtain composite image data of the pieces of image data, based on a positional shift amount between the pieces of image data and the dynamic range.

BRIEF DESCRIPTION OF THE DRAWINGS

FIGS. 2A to 2D are conceptual diagrams illustrating an example of a multi-shot composite mode according to the first embodiment of the present invention;

FIGS. 3A to 3D are conceptual diagrams illustrating an example of four pieces of image data whose exposure is changed at each relative movement position according to the first embodiment of the present invention;

FIGS. 5A and 5B are conceptual diagrams illustrating an example of dynamic range adjustment processing by a dynamic range adjusting unit according to the first embodiment of the present invention;

FIGS. 6A and 6B are conceptual diagrams illustrating an example of image data combining processing by an image data combining unit according to the first embodiment of the present invention;

FIGS. 7A to 7D are conceptual diagrams illustrating an example of combining processing of respective pieces of image data after dynamic range adjustment according to the first embodiment of the present invention;

FIGS. 8A to 8D are first conceptual diagrams illustrating an example of interpolation processing of a defective pixel by a pixel interpolating unit according to the first embodiment of the present invention;

FIGS. 16A to 16D are conceptual diagrams illustrating an example of dividing each of a plurality of images into corresponding image areas according to the second embodiment of the present invention;

DETAILED DESCRIPTION OF THE PREFERRED EMBODIMENTS

In the imaging apparatuses of Patent Documents 1 and 2, the image capturing time, the image capturing processes, and the capacity of the memory and the central processing unit (CPU) are increased, and the configuration is complicated, and the image quality has not been very high.

A problem to be addressed by an embodiment of the present invention is to provide an image capturing apparatus, an image capturing method, and an image processing apparatus that are simple in structure and that can achieve excellent image quality.

Embodiments of the present invention will be described by referring to the accompanying drawings.

First Embodiment

Figure 1:
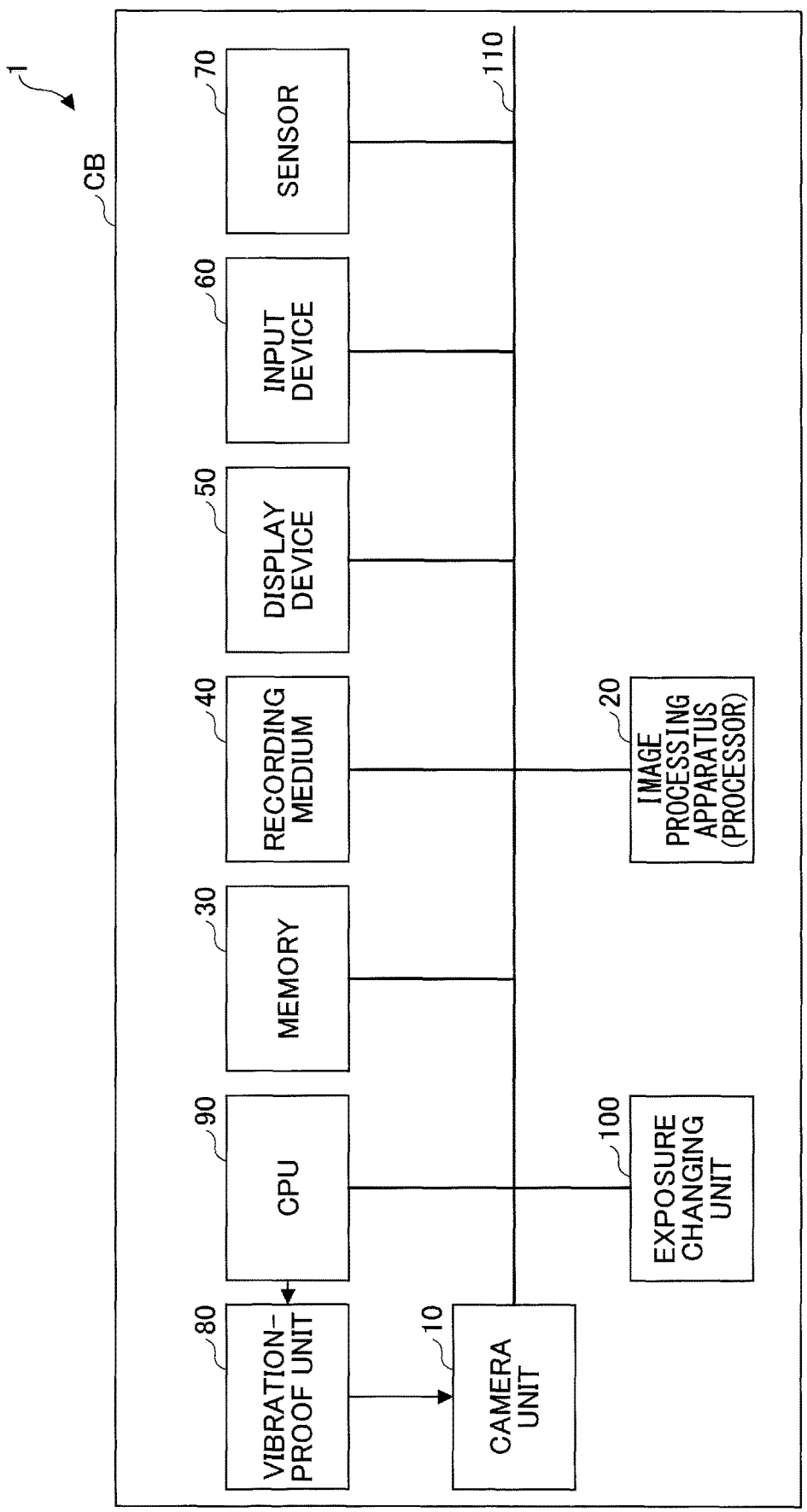
FIG. 1 is a block diagram illustrating a schematic configuration of an electronic apparatus with a camera unit mounted with an image capturing apparatus, an image capturing method, an image capturing program, an image processing apparatus, an image processing method, and an image processing program according to a first embodiment of the present invention.

FIG. 1 is a block diagram illustrating a schematic configuration of an electronic apparatus 1 equipped with a camera unit in which an image capturing apparatus, an image capturing method, an image capturing program, an image processing apparatus, an image processing method, and an image processing program according to the first embodiment are installed. The image capturing method, the image capturing program, the image processing method, and the image processing program according to the first embodiment are implemented by causing a computer built in the electronic apparatus 1 to execute predetermined processing steps.

Examples of the electronic apparatus 1 include various kinds of apparatuses equipped with an image-capturing capability such as a digital camera, a mobile phone, and a game machine. In the first embodiment, examples in which the electronic apparatus 1 is a digital camera are described. Alternatively, the electronic apparatus 1 may be various other apparatuses such as personal computers (PCs) that receive an image and perform image processing on the image, without an image-capturing capability.

The digital camera as the electronic apparatus 1 includes, inside a camera body CB, a camera unit (image data acquiring means) 10, an image processing apparatus (processor) 20, a memory (for example, a random access memory (RAM)) 30, a recording medium (for example, Universal Serial Bus (USB) memory) 40, a display device (for example, a liquid crystal display (LCD)) 50, an input device 60, a sensor 70, a vibration-proof unit 80, a central processing unit (CPU) 90, and an exposure changing unit 100, which are directly or indirectly connected to each other via a bus 110. The exposure changing unit 100 may be in a mode of being installed as one of the elements of the CPU 90 and/or may be in a mode of being installed as an element separate from the CPU 90 (for example, in a mode of being built in the camera unit 10). Note that the image processing apparatus (processor) 20 and the CPU 90 may be configured by the same hardware device or may be configured as separate hardware devices.

The camera unit 10 has an imaging optical system (not illustrated) and an image sensor (imaging element) 11 (FIG. 2). The imaging optical system forms an image of an object (object image) on the light-receiving surface of the image sensor 11, and the image sensor 11 converts the formed image into electrical signals using a plurality of pixels having different detection colors arranged in a matrix. The electrical signals are then transmitted to the image processing apparatus 20 as an image. The image processing apparatus 20 performs predetermined image processing on the image captured by the camera unit 10. The image processed by the image processing apparatus 20 is temporarily recorded in the memory 30. The image recorded in the memory 30 is stored in the recording medium 40 according to the selection and determination by the user and displayed on the display device 50.

The input device 60 includes, for example, a power switch, a release switch, a dial for selecting and setting various functions, a four-way switch, and a touch panel. The sensor 70 includes, for example, an acceleration sensor, an angular velocity sensor, and an angular acceleration sensor for detecting the acceleration, the angular velocity, and the angular acceleration of the body of the digital camera (the electronic apparatus 1), respectively. The output of the sensor 70 is transmitted to the CPU 90 as a shake detection signal indicating shaking of the body of the digital camera (the electronic apparatus 1).

The vibration-proof unit 80 moves at least one of the imaging optical system and the image sensor 11 of the camera unit 10, as a moving member (drive member), in a direction different from the direction of the optical axis of the imaging optical system (for example, within a plane orthogonal to the optical axis of the imaging optical system). The CPU 90 controls driving of the vibration-proof unit 80. The CPU 90 receives a shake detection signal indicating shaking of the body of the digital camera from the sensor 70 and causes the vibration-proof unit 80 to move the moving member in a direction different from the direction of the optical axis of the imaging optical system. With such a configuration, the image-forming position of the object image is shifted on the image sensor 11 so that the image blurring due to camera shake can be corrected. The configuration of the vibration-proof unit 80 will be described later in detail.

The digital camera (the electronic apparatus 1) operates in a shooting mode (multi-shot composite mode, multi-shot high resolution shooting mode) in which an image capturing operation is performed a plurality of times in chronological order while minutely moving the image sensor 11 of the camera unit 10 in a direction different from the direction of the optical axis of the imaging optical system (for example, within a plane orthogonal to the optical axis of the imaging optical system) using the vibration-proof unit 80. In the shooting mode (multi-shot composite mode, multi-shot high resolution shooting mode), the digital camera further combines these images to obtain one composite image (which is obtained not by simply adding the images but by processing image data using special calculations), thus generating a super high-definition (high-quality, high accuracy) image. Unlike the Bayer method of the related art that obtains only one-color information for each pixel, in the multi-shot composite mode according to the embodiments of the present disclosure, color information regarding red, green, and blue (RGB) for each pixel is obtained to draw a high-definition image with more detail and better color reproduction. Further, in the multi-shot composite mode according to the embodiments of the present disclosure, higher-sensitivity noise can be reduced without generating moire and false color.

FIGS. 2A, 2B, 2C, and 2D are diagrams for describing an example of a multi-shot composite mode according to the first embodiment. In FIGS. 2A to 2D, the image sensor 11 includes a large number of pixels arranged at a predetermined pixel pitch in a matrix on a light-receiving surface. One of the Bayer-array color filters R, G (Gr and Gb), and B is disposed on the front surface of each pixel. Each pixel detects the color of an object light beam that has been transmitted through the color filter R, G (Gr, Gb), or B on the front surface and that has hit the same pixel. That is, each pixel photoelectrically converts light of a color component (a particular wavelength region) into an electrical signal and obtains output according to the intensity (luminance) of the light. More specifically, one image is captured at the reference position of FIG. 2A, and another image is captured at a position to which the light flux region surrounded by the thick frame has been moved downward by one pixel relative to the image sensor 11 as illustrated in FIG. 2B. Further, still another image is captured at a position (FIG. 2C) to which the light flux region surrounded by the thick frame has been further moved by one pixel from the position of FIG. 2B to the right relative to the image sensor 11. Then, yet another image is captured at a position (FIG. 2D) to which the light flux region surrounded by the thick frame has been further moved upward from the position of FIG. 2C by one pixel, relative to the image sensor 11. Finally, the light flux region returns to the reference position in FIG. 2A. In such a manner, four images are captured in chronological order while moving (driving) the light flux region surrounded by the thick frame one pixel at a time relative to the image sensor 11 to draw a square within the plane orthogonal to the optical axis. Then, the captured four images are transmitted as raw image data to the image processing apparatus 20. The image processing apparatus 20 combines the four images captured in chronological order by the image sensor 11 to obtain a composite image. Note that in the examples of FIGS. 2A to 2D, although the light flux region (image capturing region) is moved by one pixel relative to the image sensor 11, in the case of a Bayer arrangement with 4 pixels, the light flux region (image capturing region) may be relatively moved by an odd number of pixels; the movement is not limited to one pixel. For example, the light flux region (image capturing region) may be moved relative to the image sensor 11 by three pixels or by five pixels.

In the multi-shot composition using the vibration-proof unit 80, the body of the digital camera (the electronic apparatus 1) is attached to, for example, a tripod, so as to reliably move the light flux region on a pixel-by-pixel basis on the image sensor 11. In the electronic apparatus 1 according to the first embodiment, the multi-shot composition is executable without using the vibration-proof unit 80 and also executable with the body of the digital camera (the electronic apparatus 1) held by the user (photographer). In other words, the electronic apparatus 1 according to the embodiments of the present disclosure obtains a composite image by the multi-shot composition based on an image misalignment (shift) for each shot due to camera shake (fluctuation) of the photographer, instead of actively moving the image sensor 11. Hereinafter, this shooting (capturing) mode is sometimes called "camera shake multi-shot composite mode".

In the camera shake multi-shot composite mode, for example, it is determined whether a plurality of pieces of image data captured by the camera unit 10 is suitable for camera shake multi-shot composition, the pixel shift amounts of the plurality of pieces of image data determined as suitable for camera shake multi-shot composition are detected, the pieces of image data to be combined are selected from the plurality of pieces of image data according to the detected pixel shift amounts of the plurality of pieces of image data, and the pieces of image data to be combined selected according to the detected pixel shift amounts of the plurality of pieces of image data are relatively moved, thereby obtaining a composite image.

By operating the input device 60 of the digital camera, it is possible to switch between the "camera shake multi-shot composite mode" and a "multi-shot composite mode using the vibration-proof unit 80". Further, the display device 50 of the digital camera is capable of displaying whether the "camera shake multi-shot composite mode" or the "multi-shot composite mode using the vibration-proof unit 80" is set. In addition to the "camera shake multi-shot composite mode" and the "multi-shot composite mode using the vibration-proof unit 80" described above, the particular shooting mode (particular image processing mode) according to the first embodiment includes a shooting mode (an image processing mode) applied to a plurality of pieces of image data, with similar composition, angle, image capturing time, and image quality, that have been selected/extracted from a plurality of pieces of image data continuously shot without camera shake, or from a designated folder and cloud storage in which a set of recorded image data such as moving images is stored. The input device 60 and the display device 50 of the digital camera enable the particular shooting mode (particular image processing mode) of a wide concept as described above to be switched and displayed.

The exposure changing unit 100 changes the exposure (exposure value) by, for example, adjusting the aperture value (F value) of the lens and/or the exposure time (shutter speed). Even in the case of multi-shot composition in which image capturing is performed a plurality of times at a time, the exposure can be changed for each piece of captured image data, and pieces of captured image data with different exposure amounts can be output. For example, the exposure changing unit 100 can change the exposure at the time of image data acquisition at each relative movement position of the image sensor 11 in the multi-shot composition. Furthermore, the user can also set a desired exposure (exposure value) by using the input device 60.

In multi-shot composition, images of the object are acquired, as pieces of image data, at a plurality of relative movement positions where the imaging surface of the image sensor 11 relatively moves with respect to the object light flux. Specifically, in the multi-shot composition using the vibration-proof unit 80, a plurality of pieces of image data are acquired while relatively moving the imaging surface of the image sensor 11 in units of pixels, with respect to the object light flux.

The exposure changing unit 100 changes the exposure (exposure value) at each relative movement position of the image sensor 11 with respect to the light flux of the object. For example, it is possible to increase or decrease the exposure (exposure value) in a stepwise manner with respect to the relative movement positions of FIGS. 2A to 2D. In this case, for example, the exposure (exposure value) may be set to an under area at the relative movement position of FIG. 2A, the exposure (exposure value) may be set to an appropriate area at the relative movement positions of FIGS. 2B and 2C, and the exposure (exposure value) may be set to an over area at the relative movement position of FIG. 2D. Alternatively, the exposure (exposure value) may be set to an over area at the relative movement position of FIG. 2A, the exposure (exposure value) may be set to an appropriate area at the relative movement positions of FIGS. 2B and 2C, and the exposure (exposure value) may be set to an under area at the relative movement position of FIG. 2D.

FIGS. 3A to 3D illustrate an example of four pieces of image data whose exposure is changed at each relative movement position. FIG. 3A illustrates image data in which the exposure (exposure value) is set to the under area, FIGS. 3B and 3C illustrate image data in which the exposure (exposure value) is set to the appropriate area, and FIG. 3D illustrates image data in which the exposure (exposure value) is set to the over area.

The under image has been captured in an underexposed state by reducing the amount of light. The appropriate image has been captured with an appropriate (standard) exposure amount by which colors and tones, which are almost as seen with the naked eye, can be reproduced. The over image has been captured in an overexposed state by increasing the amount of light. The appropriate image in the present specification includes both image data captured with the exposure (exposure value) preferred by the user, and image data captured with the appropriate exposure (standard exposure) corresponding to the object.

The image processing apparatus 20 has a function of adjusting the dynamic range of each piece of image data whose exposure is changed at each relative movement position, and changing each piece of image data according to the positional shift amount of each piece of image data, thereby obtaining composite image data of the pieces of image data. Hereinafter, the configuration and operational effects of the image processing apparatus 20 related to this function will be described in detail. Note that in the following description, a case where four pieces of image data, acquired for multi-shot composition, are used as the pieces of image data.

Figure 4:
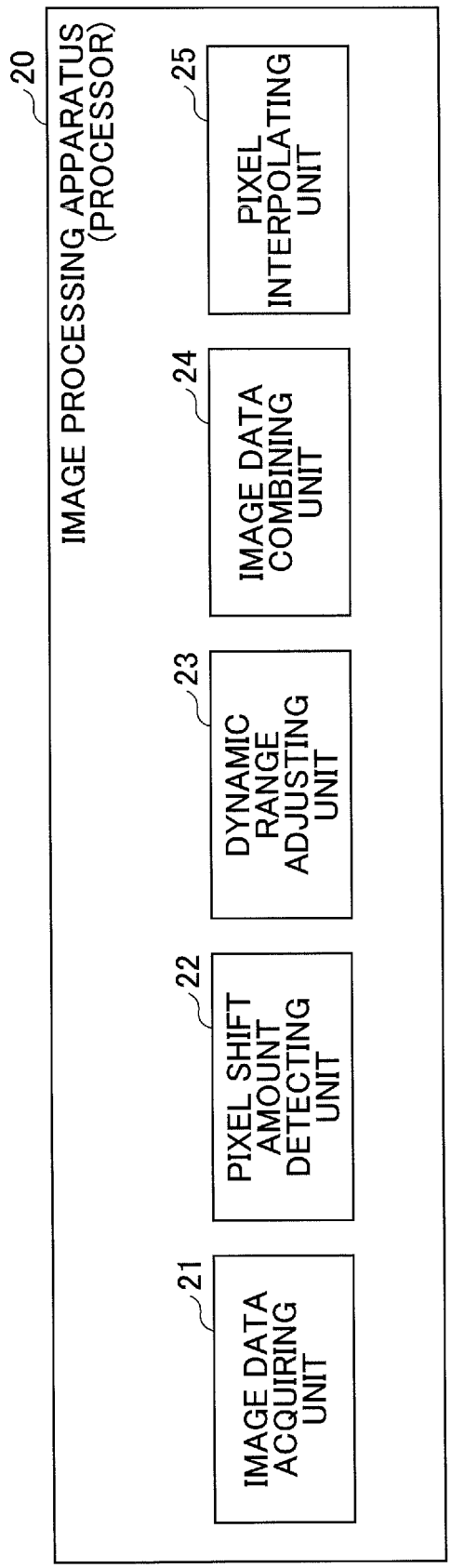
FIG. 4 is a functional block diagram illustrating an example of an internal configuration of an image processing apparatus (processor) according to the first embodiment of the present invention.

FIG. 4 is a functional block diagram illustrating an example of the internal configuration of the image processing apparatus (processor) 20. As illustrated in FIG. 4, the image processing apparatus (processor) 20 includes an image data acquiring unit (image data acquiring means, image data input means) 21, a pixel shift amount detecting unit (pixel shift amount detecting means, detection means) 22, a dynamic range adjusting unit (dynamic range adjusting means) 23, an image data combining unit (image data combining means) 24, and a pixel interpolating unit (pixel interpolating means) 25.

The image data acquiring unit 21 acquires images of an object as pieces of image data at a plurality of relative movement positions where the imaging surface of the image sensor 11 relatively moves with respect to the object light flux (acquires pieces of image data at a plurality of relative movement positions) (image data acquired by the image sensor 11 of the camera unit 10 is input). One piece of the image data among the pieces of image data may be set as "first image data", while another piece of the image data among the pieces of image data may be set as "second image data". The first image data and the second image data may be output from the same image sensor 11. The first image data and the second image data may have different image positional relationships. For example, the first image data and the second image data may be captured by different exposures from each other.

The pixel shift amount detecting unit 22 detects the pixel shift amount (positional shift amount) of each piece of image data (four pieces of image data) acquired by the image data acquiring unit 21. The pixel shift amount detecting unit 22 can reliably and precisely detect the pixel shift amount of each piece of image data by using a known technique such as block matching disclosed in Japanese Patent No. 4760923, for example.

Based on the pixel output of the image sensor 11, the pixel shift amount detecting unit 22 can detect the pixel shift amount of each piece of image data, on a pixel-by-pixel basis or on a sub-pixel-by-sub-pixel basis. Further, the pixel shift amount detecting unit 22 can detect the pixel shift amount of each piece of image data, for each RGB plane, based on the pixel output of the image sensor 11. At this time, the pixel shift amount detecting unit 22 may use only a particular RGB plane among the RGB planes, or may change the RGB plane to be used. For example, it is possible to flexibly address this matter by using the G plane when detecting the positional shift amount between certain pieces of image data, and using the R plane when detecting the positional shift amount between other pieces of image data. Further, the pixel shift amount detecting unit 22 may detect the positional shift amount of each piece of image data, based on the positional shift information of the image data as described above and output of at least one of an acceleration detector, an angular velocity detector, and an angular acceleration detector that form the sensor 70.

The pixel shift amount detecting unit 22 can combine the detection mode using the output of the sensor 70 described above with the detection mode using the pixel output of the image sensor 11. That is, after roughly estimating the directionality of the pixel shift amount by using the output of the sensor 70, an accurate pixel shift amount can be detected by using the pixel output of the image sensor 11.

When pixel output of a particular application is included in the pixel output of the image sensor 11, the pixel shift amount detecting unit 22 may detect the pixel shift amount upon interpolating or correcting the pixel output of a particular application by using other surrounding pixels, or upon excluding the pixel output of a particular application, or by applying a low weighting to the pixel output of a particular application. The pixel output of a particular application may include, for example, a phase difference detection pixel unrelated to image capturing.

The dynamic range adjusting unit 23 adjusts the dynamic range of each piece of image data (four pieces of image data) acquired by the image data acquiring unit 21. The dynamic range adjusting unit 23 adjusts the pixel output value from the image sensor 11 according to the luminance of the object (object luminance) in each piece of image data (four pieces of image data) acquired by the image data acquiring unit 21, thereby adjusting the level.

Figure 5B:
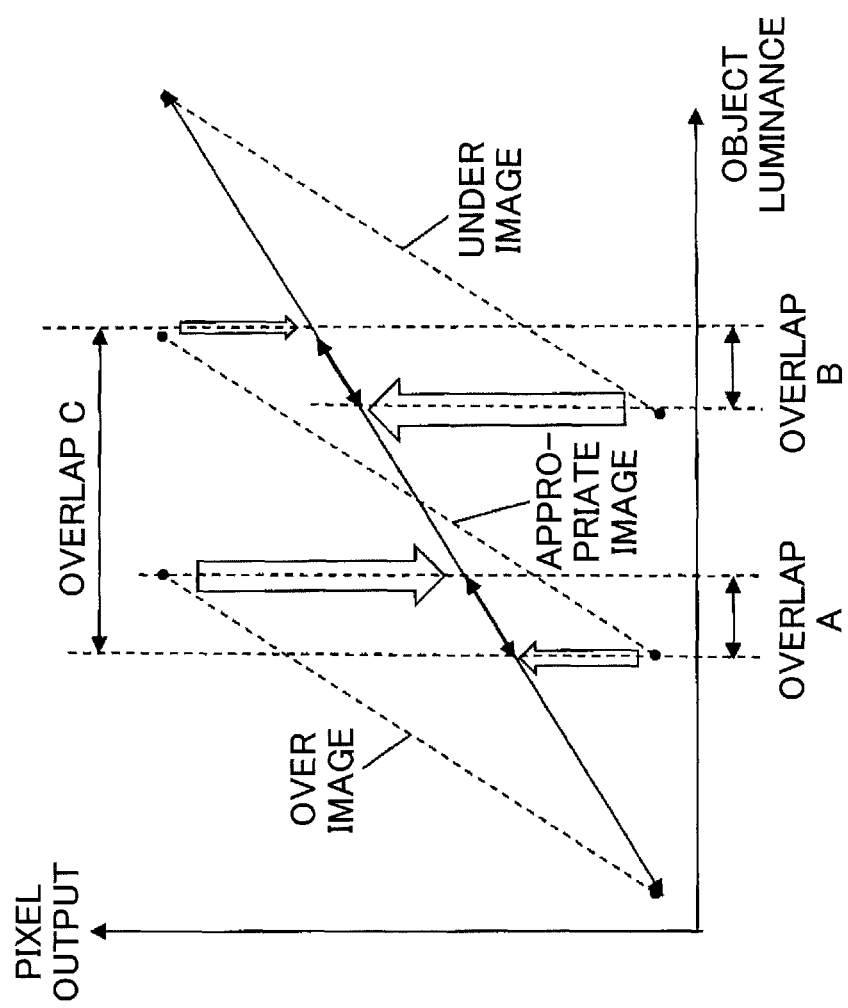

FIGS. 5A and 5B are conceptual diagrams illustrating an example of the dynamic range adjustment process by the dynamic range adjusting unit 23. FIG. 5A illustrates the relationship between the object luminance and the pixel output level before the dynamic range adjustment (each piece of image data at the time of image capturing), and FIG. 5B illustrates the relationship between the object luminance and the pixel output level after the dynamic range adjustment (each piece of image data at the time of composition). In FIGS. 5A and 5B, the pieces of image data include a total of four images including one under image in which the exposure (exposure value) is set to the under area, one over image in which the exposure (exposure value) is set to the over area, and two appropriate images in which the exposure (exposure value) is set to the appropriate area.

The under image is a captured image in a range where the object luminance is relatively high (bright). The over image is a captured image in a range in which the object luminance is relatively low (dark). The appropriate image is a captured image in which object luminance is in the middle range. Because the exposure amount is the same for the two appropriate images, the object luminance is substantially overlapping. Therefore, in FIGS. 5A and 5B, the under image and the over image are drawn by separate independent straight lines, whereas the two appropriate images are drawn with one straight line. Specifically, the straight line corresponding to the two appropriate images is sandwiched between the straight lines corresponding to under image and over image (here, the slope of the respective straight lines is the same). Incidentally, even when the object luminance is the same, the pixel output values are different for images with different exposure amounts.

In FIGS. 5A and 5B, overlap A is a range in which the object luminance of the over image and the object luminance of the appropriate image overlap with each other, and overlap B is a range in which the object luminance of the under image and the object luminance of the appropriate image overlap with each other.

These four pieces of image data are combined later into one piece of output image data. Therefore, in the image data after the composition, the range between the lower limit value of the object luminance in the over image and the upper limit value of the object luminance in the under image becomes the range of the dynamic range. That is, as can be seen from the dynamic range of each of the pieces of image data at the time of image capturing in FIG. 5A, and the dynamic range of the composite value of the images after the adjustment in FIG. 5B, it is possible to obtain preferable image data in which the dynamic range is enlarged by adjusting the dynamic range by the dynamic range adjusting unit 23 based on the four pieces of image data having different exposure amounts and combining the four pieces of image data, rather than capturing only one piece of image data.

Among the plurality of (four) captured images, the range where the object luminance levels overlap each other, as in overlap A or overlap B, includes a plurality of pieces of pixel information. Therefore, in the area where the object luminance levels overlap each other, the resolution of the image becomes high. With respect to the appropriate images, a plurality of images (two images) are captured with an appropriate exposure (exposure value), and, therefore, the range of the object luminance levels of the two appropriate images overlap with each other (overlap C), and the resolution of the image is further increased.

That is, when focusing on the upper limit and the lower limit of the object luminance in the appropriate image, in the area where the overlap A and the overlap C overlap each other and the object luminance is relatively low, due to the overlapping of the object luminance levels and the pieces of pixel information of a total of three pieces of image data including the two appropriate images and one over image, the resolution at the time of composition can be increased. Further, in the area where the overlap B and the overlap C overlap each other and the object luminance is relatively high, due to the overlapping of the object luminance levels and the pieces of pixel information of a total of three pieces of image data including the two appropriate images and one under image, the resolution at the time of composition can be increased. Furthermore, even in the intermediate area of the object luminance where the overlap C does not overlap with either overlap A or overlap B, due to the overlapping of the object luminance levels and the pieces of pixel information of the two appropriate images, the resolution at the time of composition can be increased.

The dynamic range adjusting unit 23 can adjust the overlapping amount of object luminance levels in each piece of image data, by the user operating the input device 60 or the like. The dynamic range adjusting unit 23 enlarges an area (overlap A) in which the object luminance of the over image and the object luminance of the appropriate image overlap, and/or enlarges an area in which the object luminance of the under image and the object luminance of the appropriate image overlap (overlap B), such that it is possible to enlarge the area in which the object luminance levels and the pieces of pixel information overlap in each piece of image data, thereby increasing the resolution at the time of composition.

The dynamic range adjusting unit 23 has a function of allowing the user to select a large, a medium, or a small dynamic range enlargement effect, by operating the input device 60, etc. When the dynamic range enlargement effect is set to be large, the difference in the exposure amount (exposure) between the plurality of pieces of image data is set to be large when capturing images. This reduces the overlapping area of the object luminance levels; however, the dynamic range is further enlarged. Further, when the dynamic range enlargement effect is set to be small, the difference in the exposure amount (exposure) between a plurality of images is reduced when capturing images. This increases the overlapping area of the object luminance levels, so that the dynamic range is enlarged and image data with higher resolution can be acquired. In this way, depending on the image capturing application of the user, it is possible to adjust the balance between the resolution and the dynamic range.

The image data combining unit 24 changes each piece of image data according to the pixel shift amount (positional shift amount) of each piece of image data (four pieces of image data) detected by the pixel shift amount detecting unit 22, thereby obtaining composite image data of the pieces of image data. The image data combining unit 24 obtains composite image data of the pieces of image data based on the pixel shift amount (positional shift amount) between the respective pieces of image data and the dynamic range. For example, the image data combining unit 24 executes so-called multi-shot composition, by combining the pieces of image data acquired by the image data acquiring unit 21 to obtain composite image data. The image data combining unit 24 executes a position matching calculation process on the pieces of image data, according to the pixel shift amount of each piece of image data detected by the pixel shift amount detecting unit 22, and based on the result of this position matching calculation process, the image data combining unit 24 relatively moves the pieces of image data, thereby obtaining composite image data. Here, "to relatively move each piece of image data" means to correct the data of each piece of image data so that the pieces of image data move relative to each other (to extract image data upon incorporating the relative movement of each image).

Figure 6A:
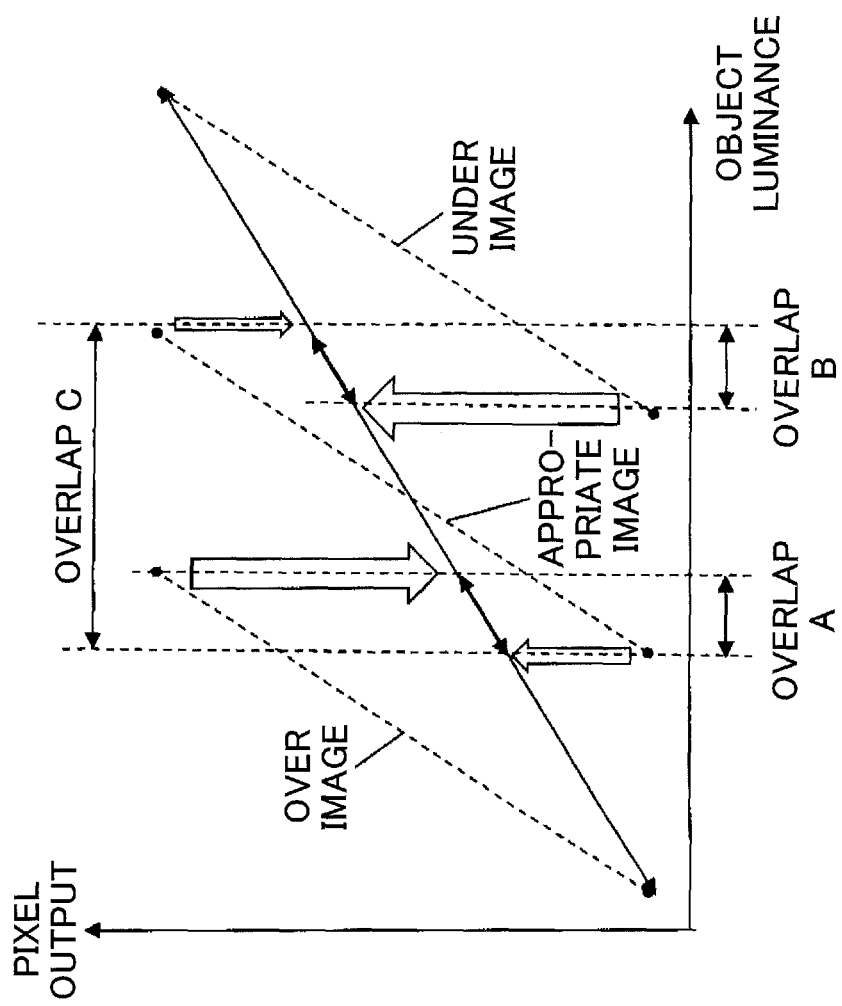

FIGS. 6A and 6B are conceptual diagrams illustrating an example of an image data combining process by the image data combining unit 24. As illustrated in FIG. 6A, as for the over image, a combining process is performed in such a direction as to decrease the slope of the pixel output with respect to the object luminance, and as for the under image, a combining process is performed in such a direction as to increase the slope of the pixel output with respect to the object luminance. Further, as for the appropriate image, the image is divided into an area where the object luminance is relatively high and an area where the object luminance is relatively low, and as for the area where the object luminance is high, a combining process is performed in such a direction as to decrease the slope of the pixel output with respect to the object luminance, and as for the area where the object luminance is low, a combining process is performed in such a direction as to increase the slope of the pixel output with respect to the object luminance. As a result, as illustrated in FIG. 6B, composite image data is obtained by combining one over image, one under image, and two appropriate images after dynamic range adjustment. The straight line, indicating the relationship between the object luminance and the pixel output of the composite image data, corresponds to a line that connects a coordinate position where the object luminance and the pixel output are minimum in the over image, and a coordinate position where the object luminance and the pixel output are maximum in the under image.

When combining the portion indicated by X in the composite image data of FIG. 6B (the portion where the over image and the appropriate image overlap each other), there may be a defective R pixel in the under image in some cases. In this case, for example, the composite image data may be obtained by interpolating the defective R pixel by one of or both of the two appropriate images.

When combining the portion indicated by Y in the composite image data of FIG. 6B (the portion where only the over image exists), defective pixels may be generated in the appropriate image and the under image in some cases. In this case, the composite image data may be obtained by acquiring, from the over image, interpolation pixels for interpolating the defective pixels, and interpolating the appropriate image and the under image by using the interpolation pixels.

FIGS. 7A to 7D are conceptual diagrams illustrating an example of a process of combining pieces of image data after dynamic range adjustment. In FIGS. 7A to 7D, in each piece of image data after the dynamic range adjustment, four pixels (R', G0', G1', B') arranged in a Bayer array are illustrated. Although not illustrated, in each piece of image data before the dynamic range adjustment, four pixels (R, G0, G1, B) arranged in a Bayer array are included. FIG. 7A corresponds to an under image, FIGS. 7B and 7C correspond to appropriate images, and FIG. 7D corresponds to an over image. The pixel shift amount between the pieces of image data is subtracted, the pixel positions in the respective pieces of image data are matched, and the position information of a common target pixel is obtained. In FIG. 7A, a pixel R' is set as the target pixel, in FIG. 7B, a pixel G0' is set as the target pixel, in FIG. 7C, a pixel G1' is set as the target pixel, and in FIG. 7D, the pixel B' is set as the target pixel. Then, a calculation process of matching the positions of the pieces of image data is executed, and based on the result of this position matching calculation process, the pieces of image data are relatively moved, thereby obtaining composite image data. At this time, it is unnecessary to actually move/combine the pieces of image data to perform the position matching calculation process (only calculation is sufficient). That is, the target pixels have an association relationship among the pieces of image data, and the target pixels differ in position information between the pieces of image data; however, the target pixels ideally indicate the same position of the object.

When any piece of the image data (first image data) among the pieces of image data includes a defective pixel (first pixel), the pixel interpolating unit 25 interpolates the defective pixel (first pixel) in one of the pieces of image data (first image data) by using an interpolation pixel (second pixel) of another one of the pieces of image data (second image data) among the pieces of image data.

As described above, when combining the portion indicated by X in the composite image data in FIG. 6B, a defective R pixel may be generated in the under image in some cases. This is because in the portion X, the appropriate image and the over image are overlapping each other, but the under image is not overlapping, and, therefore, the target pixel in the under image becomes defective. In this case, the pixel interpolating unit 25 can interpolate the R pixel (the target pixel that is a defective pixel), for example, by one of or both of the two appropriate images.

FIGS. 8A to 8D are first conceptual diagrams illustrating an example of a process of interpolating a defective pixel by the pixel interpolating unit 25. In FIGS. 8A to 8D, in each piece of image data after the dynamic range adjustment, four pixels (R', G0', G1', B') arranged in a Bayer array are illustrated. Although not illustrated, in each piece of image data before the dynamic range adjustment, four pixels (R, G0, G1, B) arranged in a Bayer array are included. FIG. 8A corresponds to an under image, FIGS. 8B and 8C correspond to appropriate images, and FIG. 8D corresponds to an over image. As illustrated in FIG. 8A, the R pixel that is the target pixel in the under image, is a defective pixel Rc.

The pixel interpolating unit 25 interpolates the defective pixel Rc of the R pixel in the under image. The method of interpolating the defective pixel Rc is not limited; however, as an example, by acquiring pixels from other pieces of data captured a plurality of times, it is possible to interpolate the defective pixel with a more natural pixel value, rather than interpolating the defective pixel with surrounding pixels in the same image. As a matter of course, the defective pixel may be interpolated with pixels surrounding the defective pixel in the under image.

Figure 9:
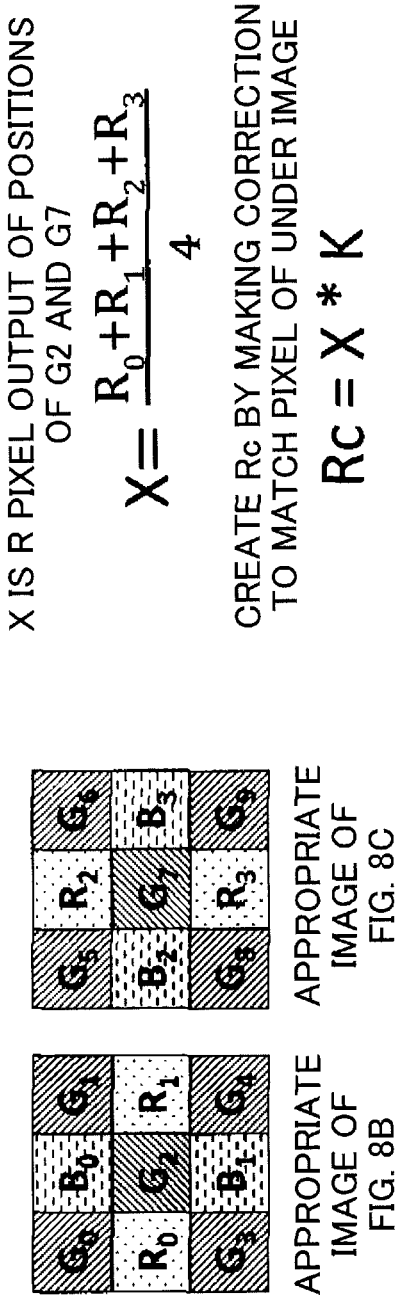
FIG. 9 is a second conceptual diagram illustrating an example of interpolation processing of a defective pixel by the pixel interpolating unit according to the first embodiment of the present invention.

FIG. 9 is a second conceptual diagram illustrating an example of a process of interpolating a defective pixel by the pixel interpolating unit 25. FIG. 9 is a diagram illustrating an example in which the R pixel in the under image of FIG. 8A is the defective pixel Rc, and an interpolation value (correction value) is calculated by referring to R pixels surrounding the target pixel in the appropriate images in FIGS. 8B and 8C, to interpolate (correct) the defective pixel Rc by using the calculated interpolation value (correction value). As illustrated in FIG. 9, the R pixel output X at the pixel coordinate position of G2 at the center of the appropriate image in FIG. 8B and/or the pixel coordinate position of G7 at the center of the appropriate image in FIG. 8C, can be obtained by X=(R0+R1+R2+R3)/4. Then, by multiplying the R pixel output X by a predetermined coefficient K, the defective pixel Rc of the under image can be obtained (Rc=X·K).

Note that in the portion where the appropriate image and the under image are overlapping but the over image is not overlapping, there is a high possibility that a defective pixel is generated in the over image. In this case as well, similar to the above, it is possible to obtain an interpolation pixel for interpolating the defective pixel in the over image.

The portion indicated by Y in the composite image data of FIG. 6B, is formed only of the over image, and the appropriate image and the under image are not overlapping in this portion. Therefore, in combining the pieces of image data (four pieces of image data) with the object luminance of the Y portion, there is a possibility that the target pixels in the two appropriate images and the one under image become defective pixels. In this case, the pixel interpolating unit 25 interpolates the defective pixels that are the target pixels in the two appropriate images and the one under image.

Figure 10:
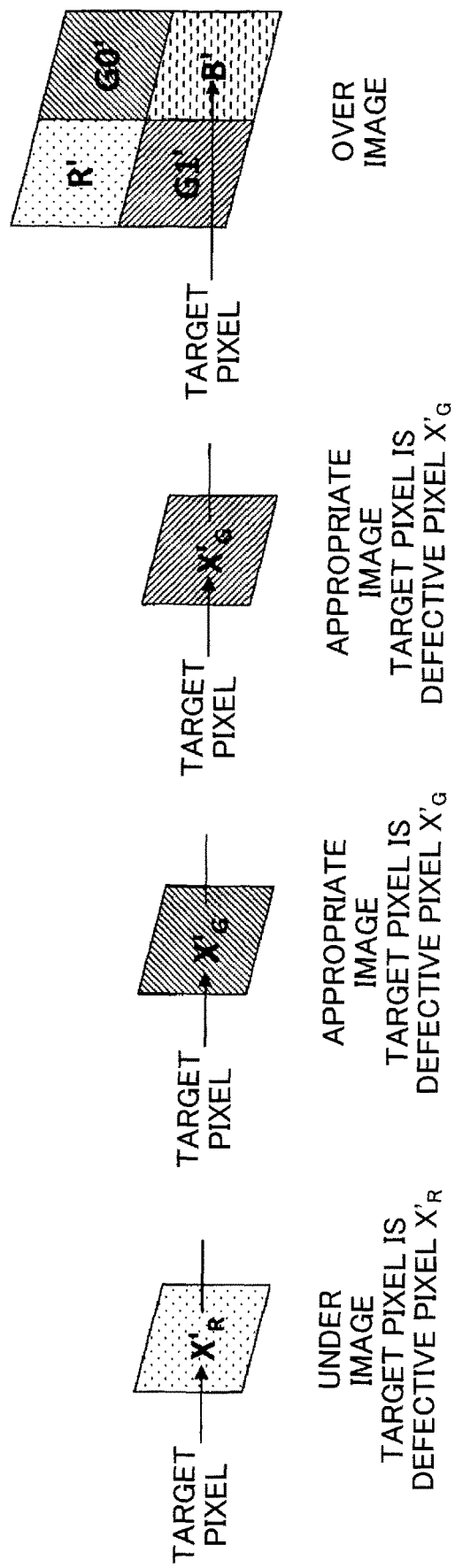
FIGS. 10A to 10D are third conceptual diagrams illustrating an example of interpolation processing of a defective pixel by the pixel interpolating unit according to the first embodiment of the present invention.

FIGS. 10A to 10D are third conceptual diagrams illustrating an example of a process of interpolating a defective pixel by the pixel interpolating unit 25. As illustrated in FIG. 10A, the target pixel in the under image is the defective pixel X'R, and as illustrated in FIGS. 10B and 10C, the target pixel in each of the appropriate images is the defective pixel X'G.

The pixel interpolating unit 25 interpolates the defective pixel X'R of the R pixel in the under image and the defective pixel X'G of the G pixel in each appropriate image. The interpolation method of the defective pixel is not limited; however, as an example, by acquiring pixels from other pieces of data captured a plurality of times, it is possible to interpolate the defective pixel with a more natural pixel value, rather than interpolating the defective pixel with surrounding pixels in the same image. As a matter of course, the defective pixel may be interpolated with pixels surrounding the defective pixel in the under image.

Figure 11:
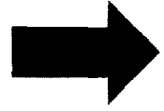
FIG. 11 is a fourth conceptual diagram illustrating an example of interpolation processing of a defective pixel by the pixel interpolating unit according to the first embodiment of the present invention.

FIG. 11 is a fourth conceptual diagram illustrating an example of a process of interpolating a defective pixel by the pixel interpolating unit 25. As illustrated in FIG. 11, when image data of 25 pixels of 5×5 is taken as an example, it is assumed that the R pixel, the G pixel, and the B pixel positioned in the center pixel are the defective pixels XR, XG, and XB. In this case, the pixel output of the defective pixel XR is obtained by XR=R4, the pixel output of the defective pixel XG is obtained by XG=(G3+G5+G6+G7)/4, and the pixel output of the defective pixel XB is obtained by XB=(B0+B1+B2+B3)/4. Then, the pixel outputs X'R, X'G, and X'B of the respective defective pixels used for composition are obtained, so as to match the level after the dynamic range adjustment. That is, pixel outputs X'R, X'G, and X'B corresponding to after the dynamic range adjustment are obtained based on the pixel outputs XR, XG, and XB before the dynamic range adjustment.

Figure 12:
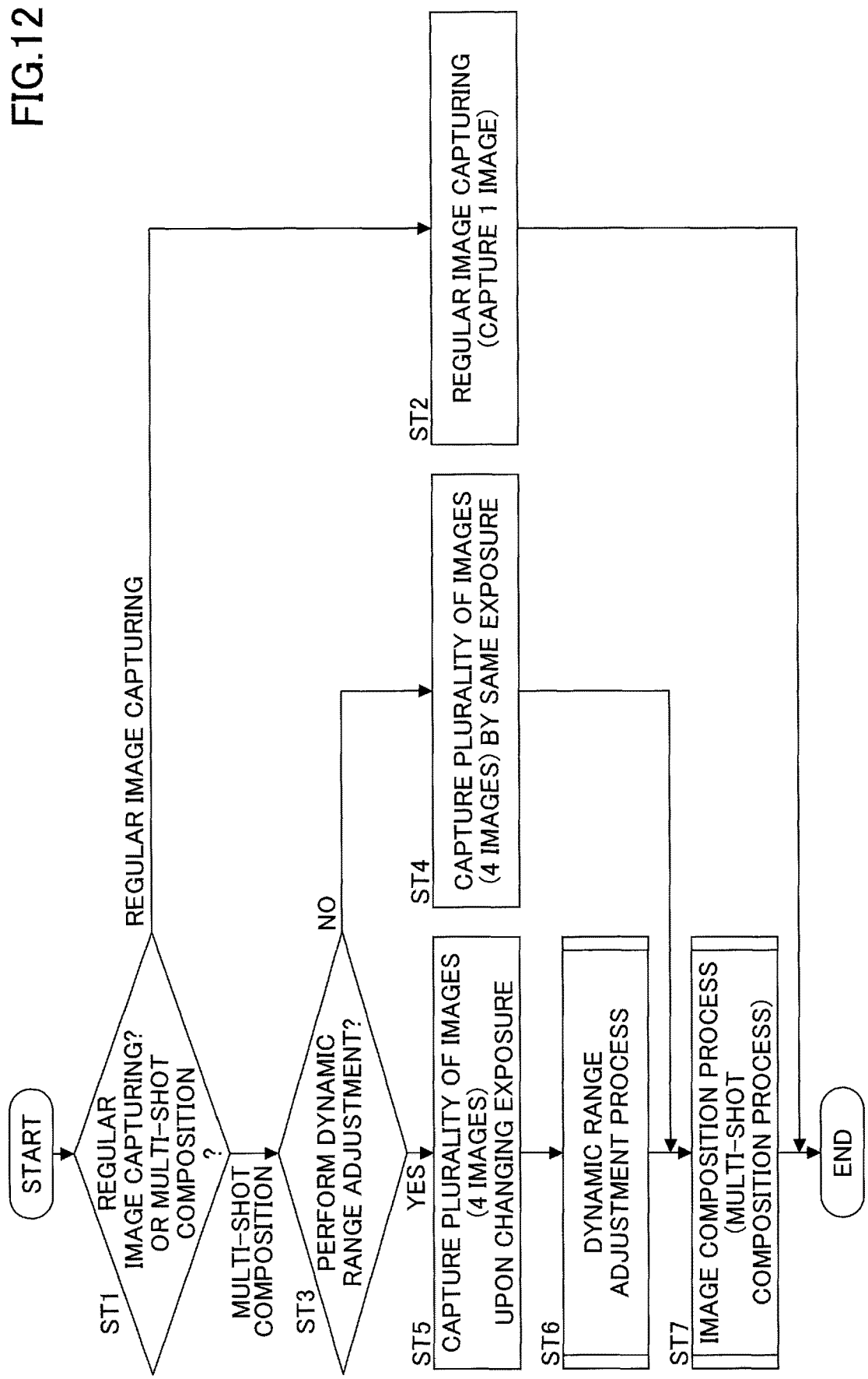
FIG. 12 is a first flowchart illustrating an example of image capturing processing according to the first embodiment of the present invention.

FIG. 12 is a first flowchart illustrating an example of an image capturing process according to the first embodiment.

In step ST1, it is determined whether to perform regular image capturing or multi-shot composition. When regular image capturing is to be performed, the process proceeds to step ST2, whereas when multi-shot composition is to be performed, the process proceeds to step ST3.

In step ST2, one image is captured by regular image capturing, and the process is ended.

In step ST3, it is determined whether a dynamic range adjustment process (a dynamic range enlargement process) is to be performed. When the dynamic range adjustment process is not to be performed (step ST3: NO), the process proceeds to step ST4, and when the dynamic range adjustment process is to be performed (step ST3: YES), the process proceeds to step ST5.

In step ST4, a plurality (four) of images is captured in chronological order, while minutely moving the image sensor 11 by using the vibration-proof unit 80. At this time, a plurality of pieces of captured image data having the same exposure amount are obtained, with the exposure (exposure value) being fixed by the exposure changing unit 100.

In step ST5, a plurality of (four) images are captured in chronological order while minutely moving the image sensor 11 by using the vibration-proof unit 80. At this time, the exposure (exposure value) is changed by the exposure changing unit 100 at least once while capturing the plurality of images, thereby obtaining a plurality of pieces of captured image data having different exposure amounts.

In step ST6, a dynamic range adjustment process is executed on a plurality of pieces of image data having different exposure amounts obtained in step ST5. The dynamic range adjustment process in step ST6 as a subroutine will be described in detail later.

In step ST7, an image combining process is performed with respect to the plurality of pieces of captured image data, obtained by performing the dynamic range adjustment process of step ST6 on the plurality of pieces of image data having the same exposure amount obtained in step ST4 or the plurality of pieces of image data having different exposure amounts obtained in step ST5, thereby acquiring a single piece of image data created by the multi-shot composition. The process of performing the image combining process on a plurality of pieces of image data as a subroutine will be described in detail later.

Note that the determination as to whether regular image capturing or multi-shot composition is to be performed in step ST1 and/or the determination as to whether the dynamic range adjustment process is to be performed in step ST3, may be selected or set as appropriate, for example, by the user operating the input device 60.

Figure 13:
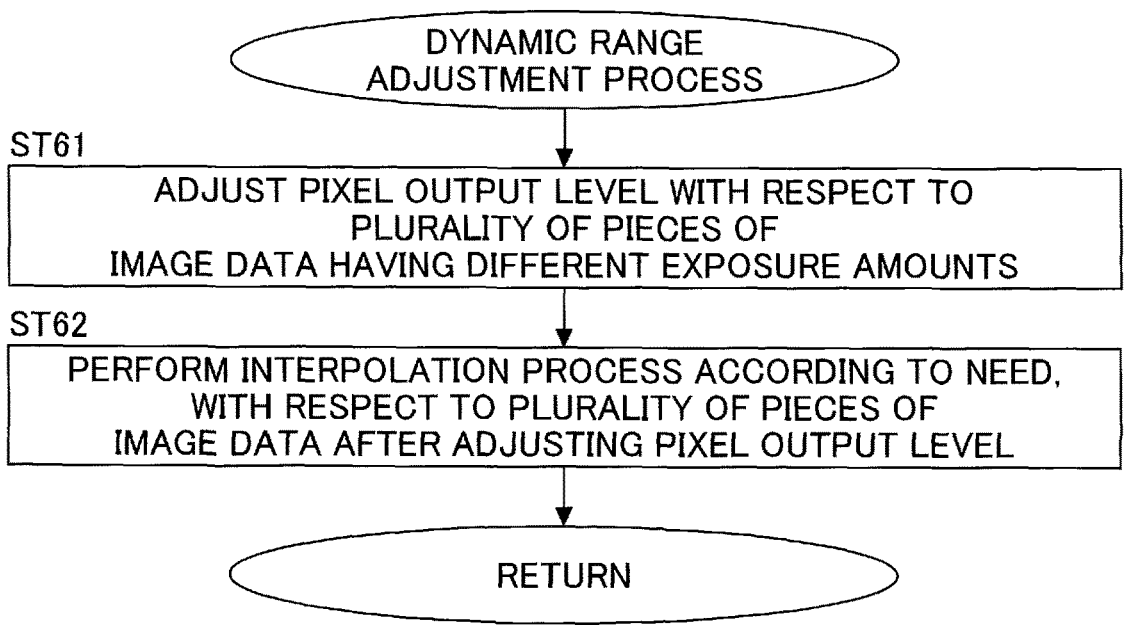
FIG. 13 is a second flowchart illustrating an example of image capturing processing according to the first embodiment of the present invention.

FIG. 13 is a second flowchart illustrating an example of an image capturing process according to the first embodiment. The second flowchart of FIG. 13 illustrates the dynamic range adjustment process of step ST6 of FIG. 12 as a subroutine.

In step ST61, the dynamic range adjusting unit 23 adjusts the pixel output level (adjustment of the dynamic range) for a plurality of pieces of image data having different exposure amounts obtained in step ST5. More specifically, the dynamic range adjusting unit 23 adjusts the output values of the pixels, by matching the output difference of the exposure (exposure value) at portions having the same object luminance (overlapping portions). The exposure amount of each piece of image data differs according to the exposure difference, and, therefore, the pixel levels are adjusted in order to combine a plurality of images having different exposure amounts.

In step ST62, the pixel interpolating unit 25 performs an interpolation process according to need, on a plurality of pieces of image data whose pixel output level has been adjusted (dynamic range adjustment has been performed). More specifically, the pixel interpolating unit 25 performs pixel interpolation for a pixel that has become defected for some reason (defective pixel). The correction value may be calculated from the pixel values surrounding the defective pixel, or may be calculated based on pixels of other images that have been captured a plurality of times. The defective pixel includes, for example, a flawed pixel whose pixel value has not been correctly output due to the sensor, or a pixel at a portion not overlapping at a certain object luminance. Note that the interpolation process is not indispensable depending on the state of the captured image, and it can be appropriately determined whether to perform the interpolation process.

Figure 14:
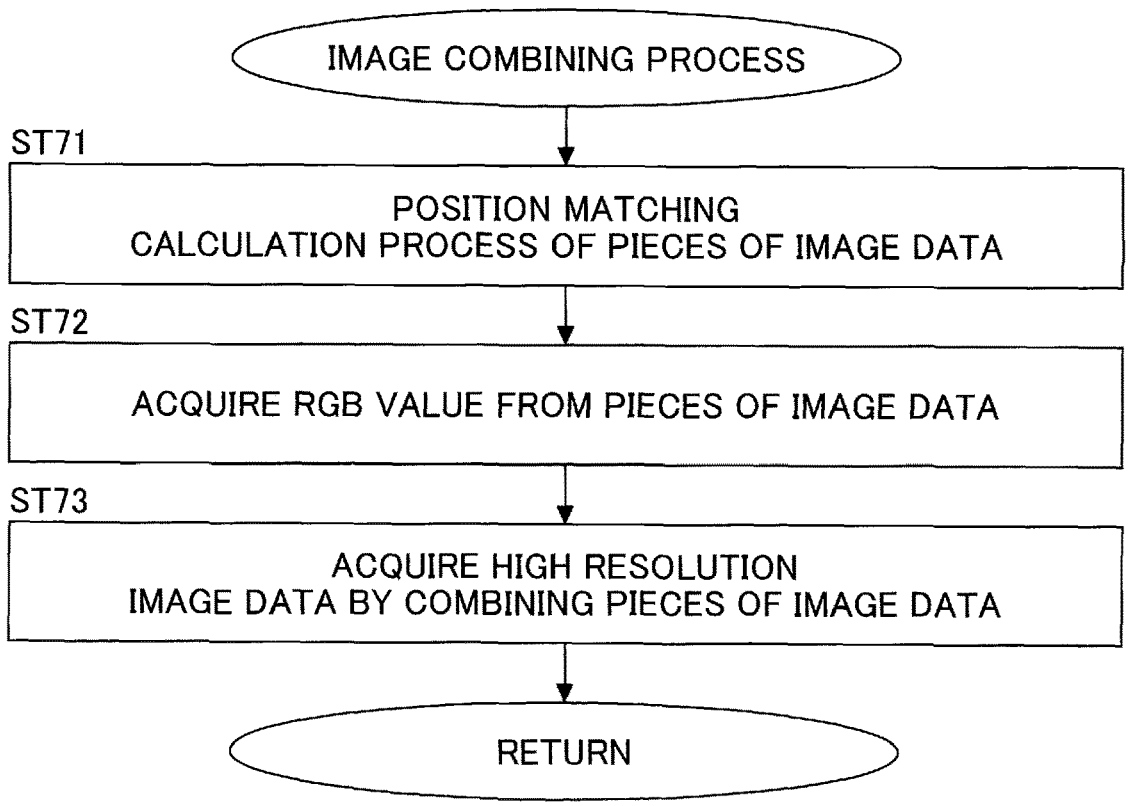
FIG. 14 is a third flowchart illustrating an example of image capturing processing according to the first embodiment of the present invention.

FIG. 14 is a third flowchart illustrating an example of an image capturing process according to the first embodiment. The third flowchart of FIG. 14 illustrates the process of performing the image combining process in step ST7 of FIG. 12 as a subroutine.

In step ST71, the position matching calculation process for each piece of image data is executed. More specifically, the image data combining unit 24 executes the position matching calculation process for each piece of image data, according to the pixel shift amount of each piece of image data detected by the pixel shift amount detecting unit 22.

In step ST72, RGB values are acquired from each piece of image data.

In step ST73, the pieces of image data are combined to acquire high resolution image data (multi-shot composition). More specifically, the image data combining unit 24 relatively moves each piece of image data based on the result of the position matching calculation process in step ST71, thereby obtaining composite image data.

As described above, in the first embodiment, the image data acquiring means (10, 21) acquires image data at a plurality of relative movement positions where the imaging surface of the image sensor 11 relatively moves with respect to the object light flux; the exposure changing unit 100 changes the exposure at the time of acquiring the image data at each relative movement position; the dynamic range adjusting unit 23 adjusts the dynamic range of the image data acquired by the image data acquiring means (10, 21); and the image data combining unit 24 obtains composite image data of the pieces of image data based on the positional shift amount between the pieces of image data and the dynamic range. Alternatively (in other words), the following processes are executed for an image set including a plurality of pieces of image data including at least a first image and a second image whose exposure is different from that of the first image. That is, the pixel shift amount detecting unit 22 (detecting means) detects the positional shift amount of the plurality of pieces of image data included in the image set. The dynamic range adjusting unit 23 (dynamic range adjusting means) adjusts the dynamic range of a plurality of pieces of image data included in the image set. The image data combining unit 24 (image data combining means) obtains composite image data of the image set based on the positional shift amount and the dynamic range of the pieces of image data. Therefore, it is possible to realize excellent image quality with a simple configuration. As the configuration is simple, it is possible to reduce the number of images to be captured and the image capturing time. As the image quality is excellent, high resolution and a wide dynamic range can be realized.

Conventionally, an image for increasing the resolution and an image for adjusting (enlarging) the dynamic range have been captured separately, and, therefore, the processing amount has been enormous. For example, suppose a case where four images are captured for increasing resolution and two images are captured for widening the dynamic range. When there is a method for each of these purposes, and the methods are combined, there is a need to capture four images for increasing the resolution two times, such that at least eight images need to be captured, and, therefore, an increased number of images need to be captured and more time is taken.

On the other hand, in the first embodiment, when capturing images by shifting the pixels in order to obtain a high-resolution image, the exposure amount is changed. At this time, the images are combined upon matching the exposure (adjusting the dynamic range) in order to obtain a high-resolution image. The missing parts such as highlights and shadows can be combined with a smaller number of images than the number of captured images, or a process is performed by reproducing (developing) the image with one image, thereby greatly reducing the number of images to be captured.

In the first embodiment described above, the case of using one over image, one under image, and two appropriate images, as a plurality of pieces of image data having different exposure (exposure value), has been described; however, the number of pieces of image data may be freely set, and the method of setting different exposures (exposure values) may be freely selected, and various design changes are possible. For example, it is also possible to use two, three, or five or more pieces of image data having different exposures (exposure values). However, it is required that the object luminance overlaps between at least two pieces of image data having different exposures (exposure values).

The image data output from the image data acquiring means (the camera unit 10 and/or the image data acquiring unit 21 of the image processing apparatus 20) may be subjected to the dynamic range adjustment process (dynamic range enlargement process), after removing signal components in the optical black area (OB) of the image data or after making corrections such as white balance correction in the image data.

In the image data acquiring means (the camera unit 10 and/or the image data acquiring unit 21 of the image processing apparatus 20), the imaging surface of the image sensor 11 is to be relatively moved with respect to the object light flux, and there is a case of intentionally moving the image sensor 11 by sensor driving (by the vibration-proof unit 80), and a case where the image sensor 11 passively moves (unintentionally) due to camera shake (an inadvertent movement of the camera), etc.

Note that in the first embodiment, dynamic range adjustment of a plurality of images performed by the dynamic range adjusting unit 23 (dynamic range adjusting means), may be performed any by method other than the above that can perform a general process of adjusting the contrast, such as a method of combining images having different exposures referred to as high-dynamic-range composition (HDR composition). Here, the high-dynamic-range composition (HDR composition) is one type of a photographing method for expressing a wider dynamic range as compared to a regular (general) image capturing method.

Further, the order of the flow for executing the selection of the composition target images and the adjustment of the dynamic range, is not particularly limited; however, it is preferable to select the composition target images first. This is because, after adjusting the dynamic range between a plurality of images, if these images cannot be selected as composition target images, the process has to be performed again from the beginning.

Second Embodiment

A second embodiment will be described with reference to FIGS. 15 to 17. Descriptions of contents overlapping with the first embodiment will be omitted.

Figure 15:
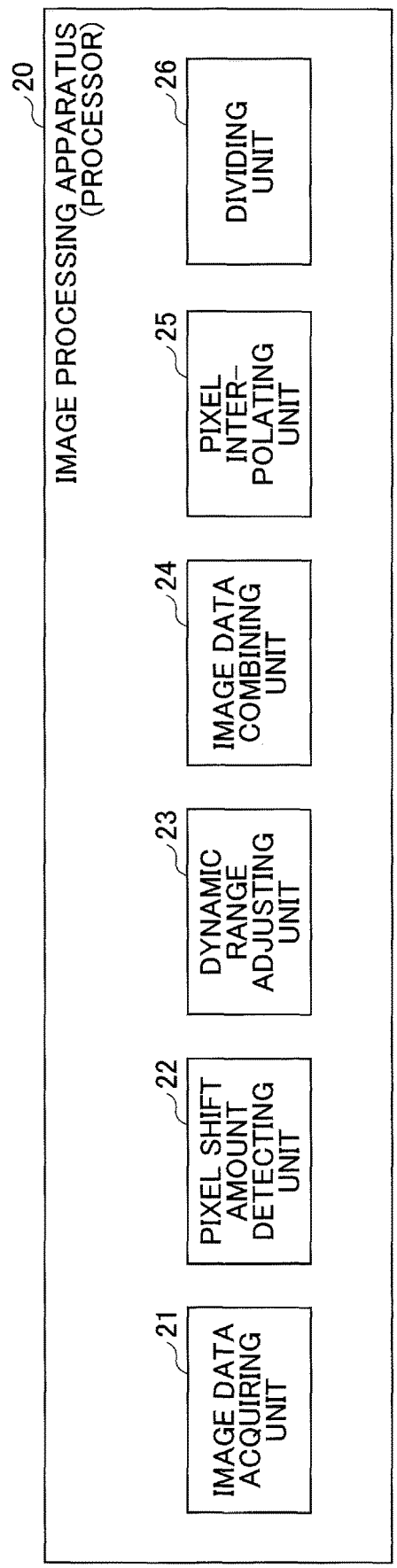
FIG. 15 is a functional block diagram illustrating the internal configuration of an image processing apparatus (processor) according to a second embodiment of the present invention.

As illustrated in FIG. 15, the image processing apparatus (processor) 20 includes a dividing unit 26, in addition to the image data acquiring unit 21, the pixel shift amount detecting unit 22, the dynamic range adjusting unit 23, the image data combining unit 24, and the pixel interpolating unit 25.

The dividing unit 26 divides each of a plurality of images into image areas corresponding to each other between the plurality of images. FIGS. 16A to 16D are diagrams illustrating an example of dividing each of a plurality of images into image areas corresponding to each other between the plurality of images. In FIG. 16A, a first image is divided into image areas 1-1, 1-2, . . . , 1-N in a matrix having the same size in the vertical direction and the horizontal direction. In FIG. 16B, a second image is divided into image areas 2-1, 2-2, . . . , 2-N in a matrix having the same size in the vertical direction and the horizontal direction. In FIG. 16C, a third image is divided into image areas 3-1, 3-2, . . . , 3-N in a matrix having the same size in the vertical direction and the horizontal direction. In FIG. 16D, a fourth image is divided into image areas 4-1, 4-2, . . . , 4-N in a matrix having the same size in the vertical direction and the horizontal direction. The block size of each image area may be freely set; for example, the block size of each image area may be set as 128 pixels×128 pixels.

The pixel shift amount detecting unit 22 detects a positional shift amount (pixel shift amount) of each of the image areas corresponding to each other between the plurality of images. To describe this based on the example of FIGS. 16A to 16D, the pixel shift amount detecting unit 22 calculates the positional shift amount (pixel shift amount) between the image area 1-1 in the first image, the image area 2-1 in the second image, the image area 3-1 in the third image, and the image area 4-1 in the fourth image. Furthermore, the pixel shift amount detecting unit 22 calculates the positional shift amount (pixel shift amount) between the image area 1-2 in the first image, the image area 2-2 in the second image, the image area 3-2 in the third image, and the image area 4-2 in the fourth image. Furthermore, the pixel shift amount detecting unit 22 calculates the positional shift amount (pixel shift amount) between the image area 1-N in the first image, the image area 2-N in the second image, the image area 3-N in the third image, and the image area 4-N in the fourth image. In this manner, the pixel shift amount detecting unit 22 calculates the correlation between blocks at the same position in each image, for example, by subpixel estimation.

The pixel shift amount detecting unit 22 selects composite target image areas from a plurality of images, according to the positional shift amount (pixel shift amount) that is a correlation value detected by the pixel shift amount detecting unit 22. For example, the pixel shift amount detecting unit 22 sets image areas in one of the images as reference image areas, sets image areas of other images as comparative image areas, and selects, as the composite target image area, a comparative image area based on the positional shift amount (pixel shift amount) between the reference image area and each comparative image area. Specifically, the pixel shift amount detecting unit 22 selects a comparative image area whose positional shift amount (pixel shift amount) is less than or equal to a predetermined threshold, whose positional shift amount is smallest among the positional shift amounts between the reference image area and the comparative image areas, and whose positional shift amount corresponds to an odd number of pixels or an even number of pixels. For example, when the image areas 1-1 to 1-N of the first image in FIG. 6A are set as the reference image areas, the pixel shift amount detecting unit 22 can select at least one of the image areas 2-1, 3-1, and 4-1 as a composite target image area corresponding to the reference image area 1-1. Further, the pixel shift amount detecting unit 22 can select at least one of the image areas 2-2, 3-2, and 4-2 as a composite target image area corresponding to the reference image area 1-2. Still further, the pixel shift amount detecting unit 22 can select at least one of the image areas 2-N, 3-N, and 4-N as a composite target image area corresponding to the reference image area 1-N.

The image data combining unit 24 obtains a composite image based on the positional shift amount (pixel shift amount), which is the correlation value detected by the pixel shift amount detecting unit 22, and the composite target image areas selected by the pixel shift amount detecting unit 22. The image data combining unit 24 obtains a composite image by executing image calculation on the composite target image areas selected by the pixel shift amount detecting unit 22, according to the positional shift amount (pixel shift amount) that is the correlation value detected by the pixel shift amount detecting unit 22. For example, the image data combining unit 24 combines or replaces the reference image area 1-1 in FIG. 16A with the composite target image area selected by the pixel shift amount detecting unit 22 from among the comparative image areas 2-1 to 4-1 in FIGS. 16B to 16D. Further, the image data combining unit 24 combines or replaces the reference image area 1-2 in FIG. 16A with the composite target image area selected by the pixel shift amount detecting unit 22 from among the comparative image areas 2-2 to 4-2 in FIGS. 16B to 16D. Further, the image data combining unit 24 combines or replaces the reference image area 1-N in FIG. 16A with the composite target image area selected by the pixel shift amount detecting unit 22 from among the comparative image areas 2-N to 4-N in FIGS. 16B to 16D.

As described above, the image data combining unit 24 executes image calculation (composition or replacement) by the composite target image areas obtained by the pixel shift amount detecting unit 22, with respect to the plurality of image areas divided by the dividing unit 26, thereby obtaining one composite image.

That is, each reference image area of one reference image is combined or replaced with a composite target image area selected from comparative image areas of the comparative images. For example, the reference image area 1-1 of the first image (the reference image) is combined or replaced with the composite target image area 2-1 of the second image, and the reference image area 1-2 of the first image is combined or replaced with the composite target image area 3-2 of the third image. Further, the reference image area 1-N of the first image is combined or replaced with a composite target image area 4-N of the fourth image.

Note that when the pixel shift amount detecting unit 22 fails to select an appropriate composite target image area from the comparative image areas of the comparative images for a certain reference image area of the reference image, the reference image area may be used as is without the composition or replacement of the reference image area.

Figure 17:
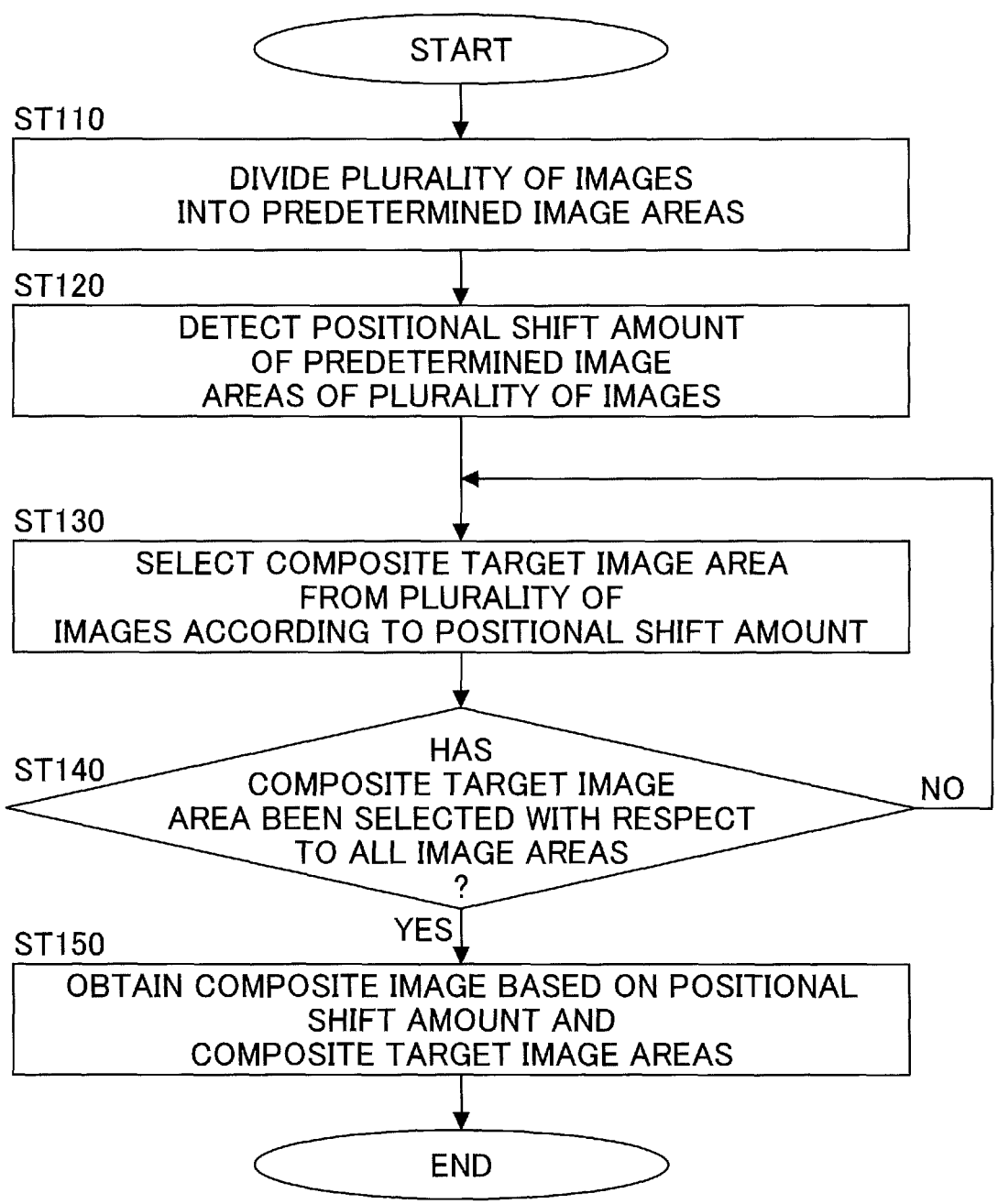
FIG. 17 is a flowchart illustrating an example of image capturing processing according to the second embodiment of the present invention.

FIG. 17 is a flowchart of an image capturing process according to the second embodiment.

In step ST110, the dividing unit 26 divides each of a plurality of images into image areas corresponding to each other between the plurality of images.

In step ST120, the pixel shift amount detecting unit 22 detects the positional shift amount (pixel shift amount) of each of the image areas corresponding to each other between the plurality of images.

In step S130, the pixel shift amount detecting unit 22 selects a composite target image area from the plurality of images, according to the positional shift amount (pixel shift amount) that is a correlation value.

In step ST140, it is determined whether a composite target image area has been selected with respect to all image areas. When a composite target image area has not been selected with respect to all image areas (step ST140: NO), the process returns to step ST130 to repeat the loop of step ST130 and step ST140 until a composite target image area is selected for all the image areas. When a composite target image area has been selected with respect to all image areas (step ST140: YES), the process proceeds to step ST150.

In step ST150, the image data combining unit 24 obtains a composite image based on the positional shift amounts (pixel shift amounts) that are correlation values and the selected composite target image areas.

In the second embodiment described above, each of a plurality of images is divided into image areas corresponding to each other between the plurality of images, and the positional shift amount of each of the image areas corresponding to each other between the plurality of images is detected. Then, a composite target image area is selected from the plurality of images based on the positional shift amount, and a composite image is obtained based on the positional shift amounts and the composite target image areas. Therefore, with the configuration according to the second embodiment of the present disclosure, a higher-quality image (having high detail and less moiré, less false color, and less high sensitivity noise, etc.) can be provided as compared to the configuration according to the first embodiment in which the positional shift amount is detected on an image-by-image basis and composite target images are selected to obtain a composite image.

In the first embodiment, as one of the features, the exposure at the time of acquiring the image data at each relative movement position is changed, the dynamic range of the acquired image data is adjusted, and based on the amount of positional shift between the respective pieces of image data and the dynamic range, composite image data of the pieces of image data is obtained.

Here, a pre-stage process of acquiring (inputting) a plurality of pieces of image data having different exposures, a middle-stage process of adjusting the dynamic range before image composition, and a post-stage process of combining the pieces of image data after dynamic range adjustment, are assumed. For example, it is conceivable to detect the positional shift amount of a plurality of images, select a composite target image from a plurality of images according to the positional shift amount, and to obtain a composite image based on the positional shift amounts and the composite target images. That is, it is conceivable that the pixel shifts amount of a plurality of images are detected, one of the plurality of images is set as the reference image, and the remaining images are set as the comparative images, and according to the pixel shift amount between the reference image and each comparative image, a composite target image is selected from among the comparative images, and the reference image and the composite target image are relatively moved according to the positional shift amount to obtain a composite image.

In a case where a plurality of images for adjusting the exposure/dynamic range according to the present application, is applied to the reference image and the comparative image (composite target image), and the plurality of images having the adjusted exposure/dynamic range is combined, it is possible to obtain a high-resolution (high-quality) composite image.

In the second embodiment, the case where each image is divided into a plurality of image areas, and the respective image areas are paired and the comparison calculation is performed on the paired image areas, has been described as an example. However, for example, in the case of performing multi-shot composition in which the image sensor is relatively moved by one pixel at a time, it is possible to pair the images together and perform the comparison calculation on the paired images, without dividing the image into image areas, pairing the image areas, and performing the comparison calculation on the paired image areas.

Third Embodiment

The digital camera according to the first and second embodiments does not drive (for example, image blur (vibration) correction drive) a moving member (for example, the image sensor 11) using the vibration-proof unit 80 in the multi-shot composite mode. However, when the image blur correction drive is performed crudely while using the vibration-proof unit 80 without perfectly correcting the positional shift of a plurality of images (images are not perfectly aligned at a specific position), the image blur correction drive is executed using the vibration-proof unit 80.

That is, executing the image blur correction drive using the vibration-proof unit 80 still fails to completely eliminate image blur (the image is misaligned (shifted) on the order of several microns). Accordingly, in the configuration according to the third embodiment, such an image shift (misalignment) is used in the multi-shot composition. This configuration is based on the concept that the amount of drive in the image blur correction drive using the vibration-proof unit 80 is significantly larger than the positional shift amount (pixel shift amount) of each image used in the multi-shot composition.

In the third embodiment, a plurality of images is obtained by, for example, continuous shooting after setting the multi-shot composite mode (the multi-shot composite mode using camera shake, with image blur correction drive using the vibration-proof unit 80). Then, one composite image is obtained by image combining processing based on the plurality of images.

For example, the configuration according to the third embodiment can detect the pixel shift amounts of a plurality of images, set any one of the plurality of images as a reference image, and set the remaining images as comparative images. Further, the configuration can select a composite target image from the comparative images based on the pixel shift amount between the reference image and each of the comparative images, and move the composite target image relative to the reference image based on the positional shift amount (pixel shift amount) to obtain a composite image.

Alternatively, the configuration according to the third embodiment can divide each of a plurality of images into image areas corresponding to each other, and detect a positional shift amount of each of the image areas corresponding to each other between the plurality of images. Further, the configuration according to the third embodiment can select a composite target image area from the plurality of images based on the positional shift amounts.

The configuration of the vibration-proof unit 80 is described in detail with reference to FIGS. 18A, 18B, 19, 20, and 21. In each figure, a first direction (Z direction and Z-axis direction) is parallel to the optical axis O of the imaging optical system and a second direction (X direction and X-axis direction) is orthogonal to the first direction.

Further, a third direction (Y direction and Y-axis direction) is orthogonal to both the first direction and the second direction. For example, assuming that the X axis, the Y axis, and the Z axis are coordinate axes in a three-dimensional orthogonal coordinate system, when the optical axis O is designated as the Z axis, the X axis and the Y axis are orthogonal to each other and both are orthogonal to the X-axis. When the digital camera is disposed in the normal position (horizontal position), the first direction (the Z direction, the Z axis, the optical axis O) and the second direction (the X direction and the X axis) are along the horizontal direction of the digital camera, and the third direction (the Y direction and the Y-axis) are along the vertical direction of the digital camera.

The digital camera (the electronic apparatus 1) includes, as a unit for detecting vibration (fluctuation) of a camera body CB, a roll (tilt (rotation) around the Z-axis) detecting unit, a pitch (tilt (rotation) around the X-axis) detecting unit, a yaw (tilt (rotation) around the Y-axis) detecting unit, an X-direction acceleration detecting unit, a Y-direction acceleration detecting unit, and a Z-direction acceleration detecting unit. Each detection unit includes a 6-axis sensor or a set consisting of a 3-axis gyro sensor and a 3-axis acceleration sensor. In some embodiments, each detecting unit may constitute the sensor 70 in FIG. 1.

An imaging block (for example, the camera unit 10 in FIG. 1) includes an image sensor 110A and a stage device 120 that supports the image sensor 110A. The stage device 120 includes a movable stage 121 on which the image sensor 110A is mounted, a front stationary yoke 122 on the front of the movable stage 121, and a rear stationary yoke 123 on the back of the movable stage 121. The stage device 120 is capable of moving up the movable stage 121 (moved up against gravity and kept at rest) relative to the front and rear stationary yokes 122 and 123 at least when made conductive. The stage device 120 is capable of moving the movable stage 121 in a floating state (moved up) along the Z direction (first direction) (parallel movement in the Z direction), along the X direction (second direction) (parallel movement in the X direction) orthogonal to the Z direction, and along the Y direction (third direction) (parallel movement in the Y direction) orthogonal to both the Z direction and the X direction. Further, the stage device 120 is capable of causing the movable stage 121 in a floating state (moved up) to tilt (rotate) around the X-axis (second direction), around the Y-axis (third direction), and around the Z-axis (first direction). That is, the movable stage 121 is movable with six degrees of freedom, with respect to 6 axes.

The body CPU (for example, the CPU 90 in FIG. 1) calculates the direction of blur and the blur speed of the digital camera based on pitch (tilting (rotation) in the X direction), yaw (tilting (rotation) in the Y direction), roll (tilting (rotation) in the Z direction), the X-direction acceleration, the Y-direction acceleration, and the Z-direction acceleration. The body CPU calculates, for example, the drive direction, the drive speed, the drive amount of drive of the image sensor 110A to prevent an image projected onto the image sensor 110A from moving relative to the image sensor 110A. Based on the calculation results, the CPU causes the stage device 120 to travel in parallel, tilt, travel in parallel while tilting, travel in parallel after tilting, and tilt after traveling in parallel.

The stage device 120 holds the movable stage 121, to which the image sensor 110A is fixed, such that the movable stage 121 freely travels in parallel, tilts, travels in parallel while tilting, and travels in parallel after tilting relative to the front stationary yoke 122 and the rear stationary yoke 123.

The movable stage 121 is a rectangular plate member larger than the image sensor 110A when viewed from the front. The front stationary yoke 122 and the rear stationary yoke 123 are rectangular frame members each having the same shape and an outer shape larger than the movable stage 121 in plan view. Each of the front stationary yoke 122 and the rear stationary yoke 123 has a rectangular opening (122a/123a) larger than the outer shape of the image sensor 110A at the central portion of each of the front stationary yoke 122 and the rear stationary yoke 123, when viewed from the front (the Z direction).

Figure 18A:
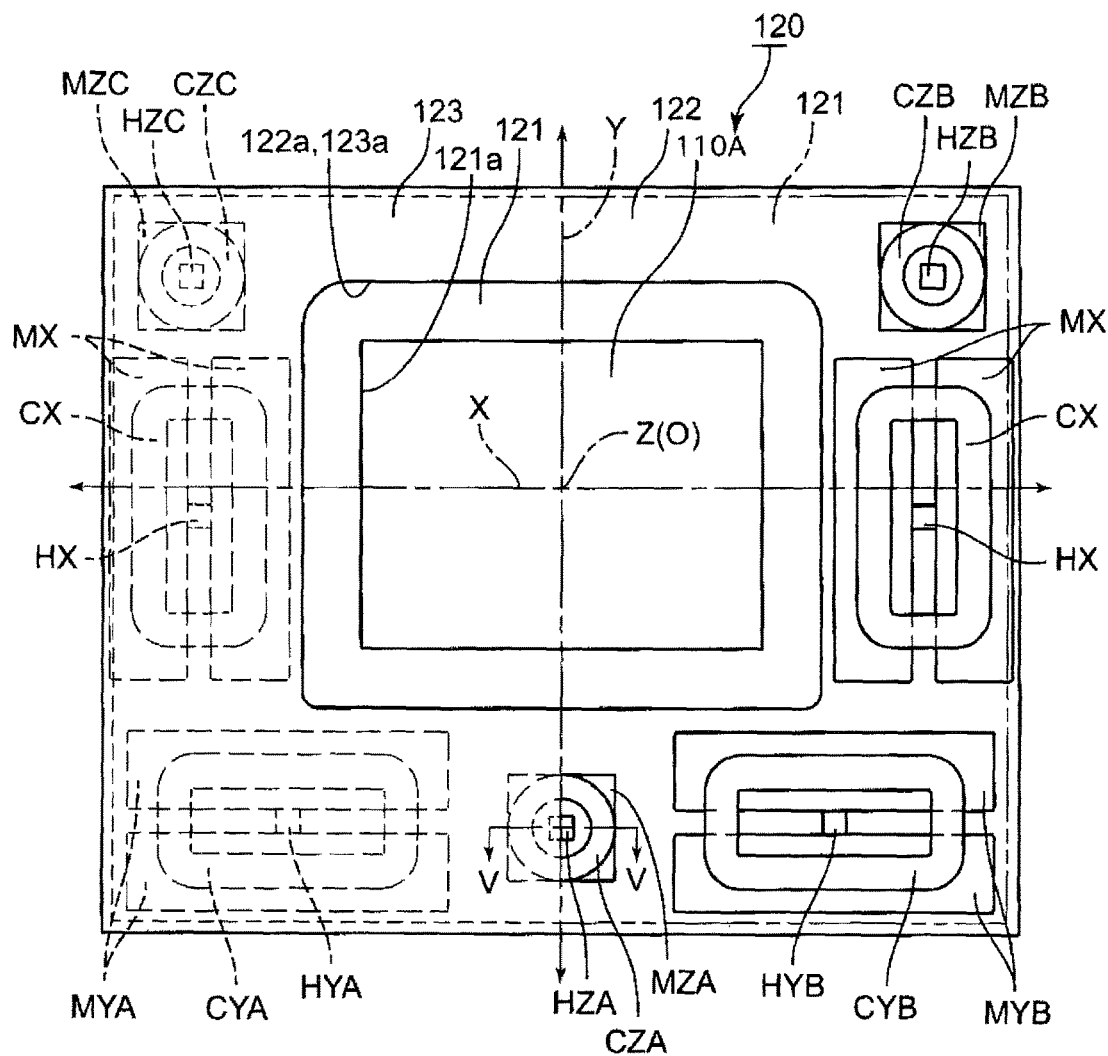
FIGS. 18A and 18B are a rear view and a cross-sectional view, respectively, of an example configuration of a vibration-proof unit according to a third embodiment of the present invention.
Figure 18B:
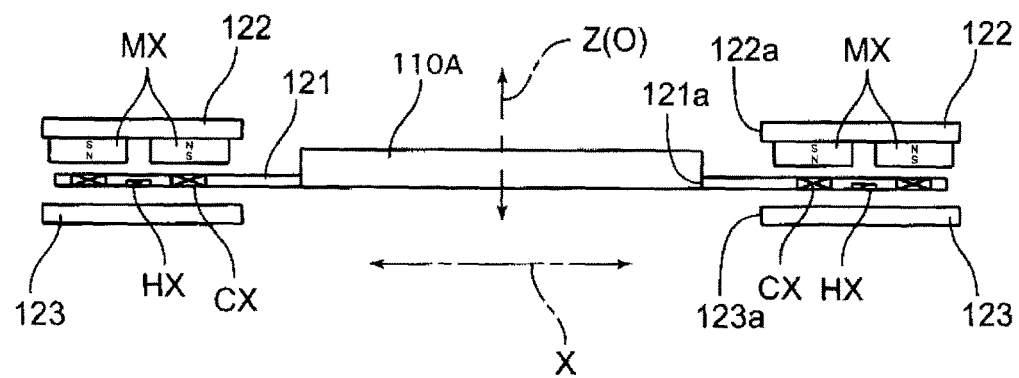
Figure 19:
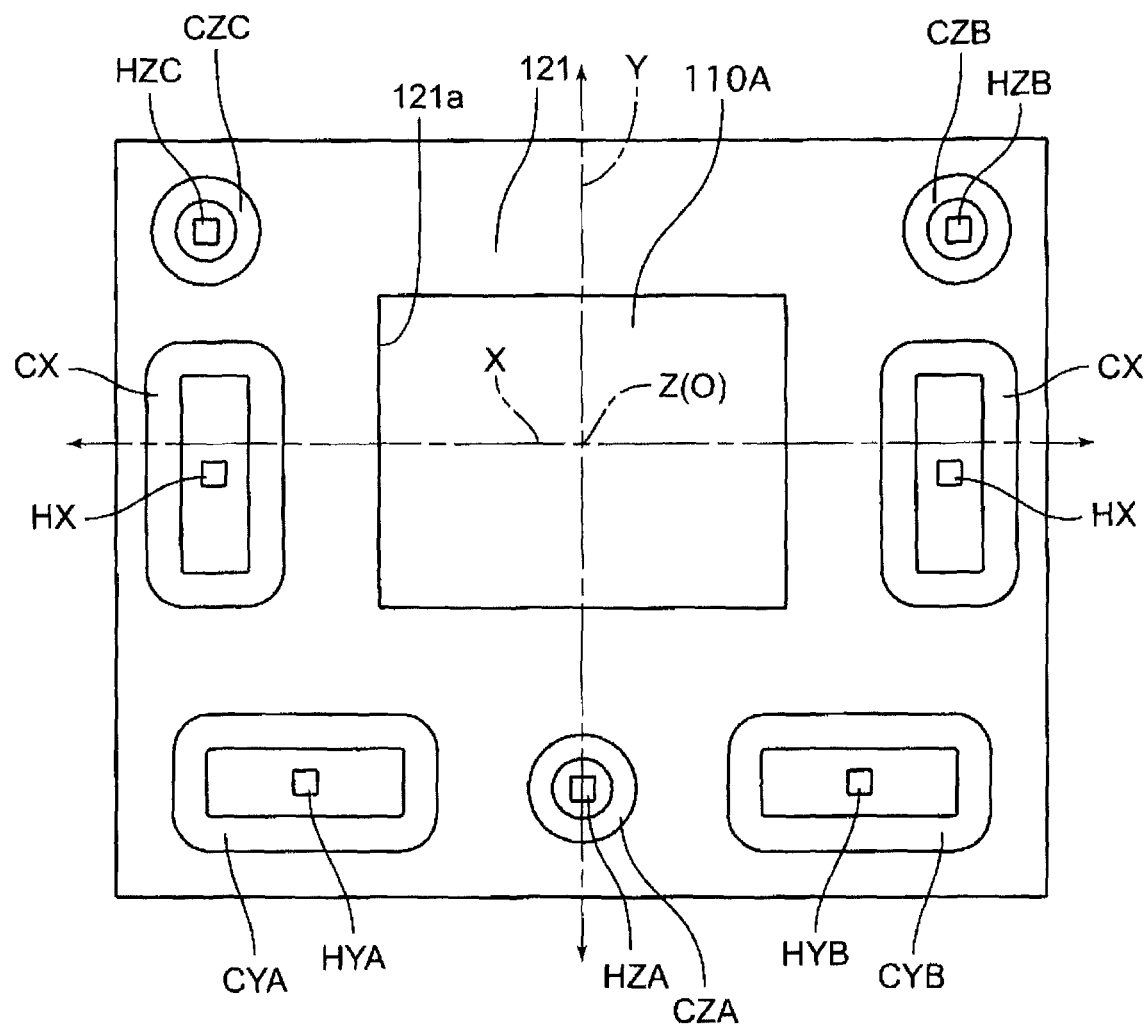
FIG. 19 is a rear view of a movable stage of the vibration-proof unit according to the third embodiment of the present invention.
Figure 20:
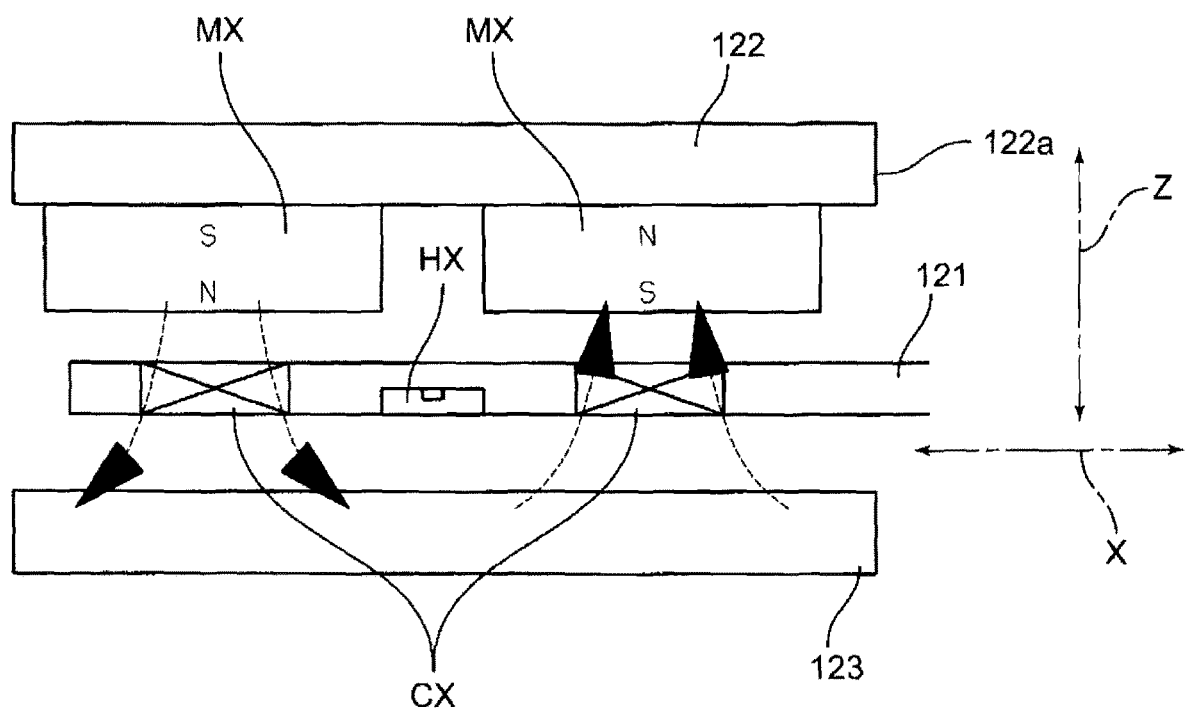
FIG. 20 is an enlarged cross-sectional view of an X drive unit including an X-direction magnet and an X-drive coil according to the third embodiment of the present invention.
Figure 21:
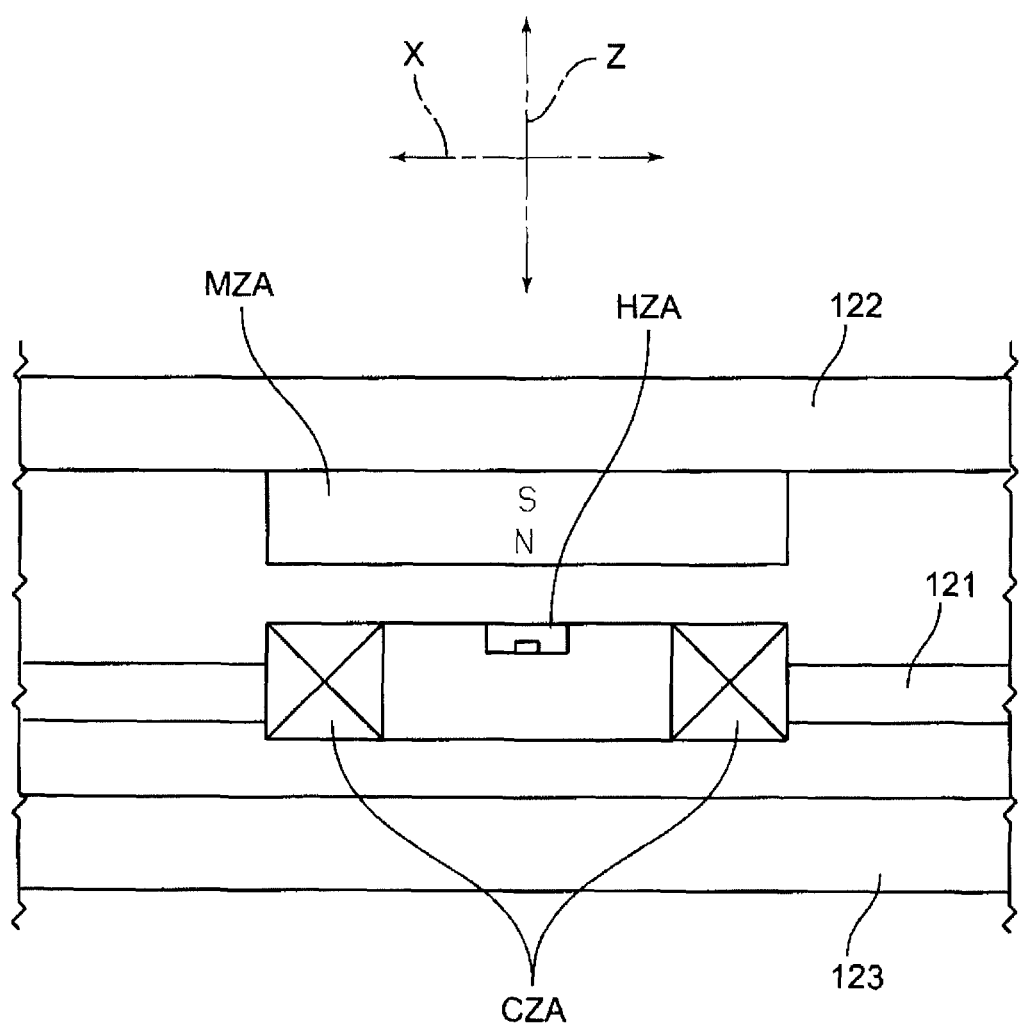
FIG. 21 is an enlarged cross-sectional view of a Z drive unit including a Z-direction magnet, a Z-drive coil, and a Z-direction Hall element according to the third embodiment of the present invention.

The front stationary yoke 122 has an X-direction magnet MX on at least one side of the right and left (X direction) of the opening 122a with respect to the Z-axis with the Y-axis as the center line on the back (the surface opposite to the object side). However, in the embodiment as illustrated in FIGS. 18A and 18B, an X-direction magnet MX is disposed on each side of the right and left of the opening 122a. That is, a pair of X-direction magnets MX, each made of a permanent magnet having the same specification, is fixed to the back surface of the front stationary yoke 122. By passing the magnetic flux of the X-direction magnets MX through the front stationary yoke 122 and the rear stationary yoke 123, a magnetic circuit that generates thrust in the X direction (the second direction) is formed between the X-direction magnets MX on the right and left sides and the opposed portion of the rear stationary yoke 123.

The front stationary yoke 122 has a pair of a Y-direction magnet MYA and a Y-direction magnet MYB at the lower side relative to the opening 122a on the back of the front stationary yoke 122. The magnet MYA and the magnet MYB are opposed to each other across the Y-axis as the center line and away from the Z-axis. Each of the magnet MYA and the magnet MYB is a permanent magnet having the same specification. By passing the magnetic flux of the magnet MYA and the magnet MYB through the front stationary yoke 122 and the rear stationary yoke 123, a magnetic circuit that generates thrust in the Y direction (the third direction) is formed between the Y-direction magnet MWA and the Y-direction magnet MWB and the rear stationary yoke 123.

The front stationary yoke 122 also has Z-direction magnets MZA, MZB, and MZC fixed onto three positions away from the Y-direction magnets MYA and MYB on the back surface. The magnets MZA, MZB, and MZC are permanent magnets of the same specification. The three Z-direction magnets MZA, MZB, and MZC are disposed at substantially equal intervals in a plane orthogonal to the Z-axis with the Z axis as the center of the plane. By passing a magnetic flux of the Z-direction magnets MZA, MZB, and MZC through the front stationary yoke 122 and the rear stationary yoke 123, a plurality of magnetic circuits that generates thrust in the Z direction (the first direction) is formed between the Z-direction magnets MZA, MZB, and MZC and the rear stationary yoke 123.

The movable stage 121 has a hole 121a for the image sensor 110A at the center portion of the movable stage 121. The hole 121a is rectangular when viewed from the front. The image sensor 110A is fit in the hole 121a. The image sensor 110A projects forward beyond the hole 121a in the direction of the optical axis O of the movable stage 121.

The movable stage 121 further has a pair of X-drive coils CX and a pair of a Y-drive coil CYA and a Y-drive coil CYB. The X-drive coils CX are fixed onto the outer portions of the right and left sides (short sides) of the image sensor 110A, respectively. The Y-drive coil CYA and the Y-drive coil CYB are fixed onto the lower portion of the image sensor 110A (in the vicinity of the lower side (long side) of the image sensor 110A), apart from each other along the right-to-left direction of the image sensor 110A. The movable stage 121 further has a circular Z-drive coil CZA and a pair of circular Z-drive coils CZB and CZC. The Z-drive coil CZA is stationary (in the intermediate position) between the Y-drive coils CYA and CYB. The Z-drive coils CZB and CZC are stationary at the upper position relative to the pair of the X-drive coils CX.

The above-described X-drive coil CX, the Y-drive coil CYA, the Y-drive coil CYB, the Z-drive coil CZA, the Z-drive coil CZB, and the Z-drive coil CZC are connected to an actuator drive circuit that controls power distribution.

In the movable stage 121, X-direction Hall elements HX are fixed in the air core areas of the X-drive coils CX, and a Y-direction Hall element HYA and a Y-direction Hall element HYB are fixed in the air core areas of the Y-drive coils CYA and CYB, respectively. Further, Z-direction Hall elements HZA, HZB, and HZC are fixed in the air core areas of Z-drive coils CZA, CZB, and CZC, respectively.

A position detection circuit detects the position of the movable stage 121 in the X direction, the position in the Y direction, the position in the Z direction, the position of tilt rotation around the X-axis (tilt rotation angle around the X-axis and pitch angle), the position of tilt rotation around the Y-axis (tilt rotation angle around the Y-axis and Yaw angle), and the position of tilt rotation around the Z-axis (tilt rotation angle around the Z-axis and roll angle), based on detection signals output from X-direction Hall elements HX, the Y-direction Hall elements HYA and HYB, and Z-direction Hall elements HZA, HZB, and HZC.

Based on the detection result of the position detection circuit, the actuator drive circuit drives the image sensor 110A (the movable stage 121) by controlling power distribution to the X-drive coils CX, the Y-drive coils CYA, CYB, CZA and the Z-drive drive coils CZA, CZB, and CZC. For example, the vibration-proof unit 80 serves as a camera shake correction device (drive device) that corrects image blur (vibration) by driving (moving) the image sensor 110A, which is a part of the image-capturing device, as a drive member in a direction different from the direction of the optical axis O (Z-axis) of the image-capturing device. Note that the drive member to be driven is not limited to the image sensor 110A, and may be, for example, an image-blur correction lens as a part of the photographing lens.

The present inventor has conceived of the following concept through intensive studies of a technique of executing multi-shot composite while executing image-blur correction drive using the above-described hexaxial drive unit (however, the mode of image-blur correction is not limited) as one example. Even if a parallel-direction shift of the drive member (image sensor) remains within a plane (XY plane) orthogonal to the optical axis O (Z axis), the image quality of the multi-shot composite is not adversely affected. However, it is found that if a rotational-direction shift of the drive member (image sensor) remains within the plane (XY plane) orthogonal to the optical axis O (Z axis), the image quality of the multi-shot composite is adversely affected.

As described above, in the embodiments of the present disclosure, the image calculation such as detection of the positional shift amount (pixel shift amount) of a plurality of images or image areas is performed based on the XY coordinate axes in the XY plane. Accordingly, when a rotational shift within the XY plane is large, correlation between a plurality of images or between a plurality of image areas cannot be obtained, and appropriate image calculation may be difficult.

Figure 22A:
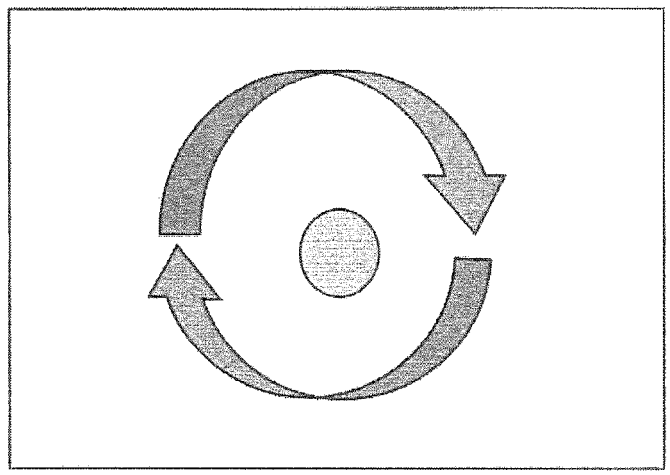
FIGS. 22A and 22B are diagrams illustrating adverse effects of image blur in the rotational direction within an XY plane.
Figure 22B:
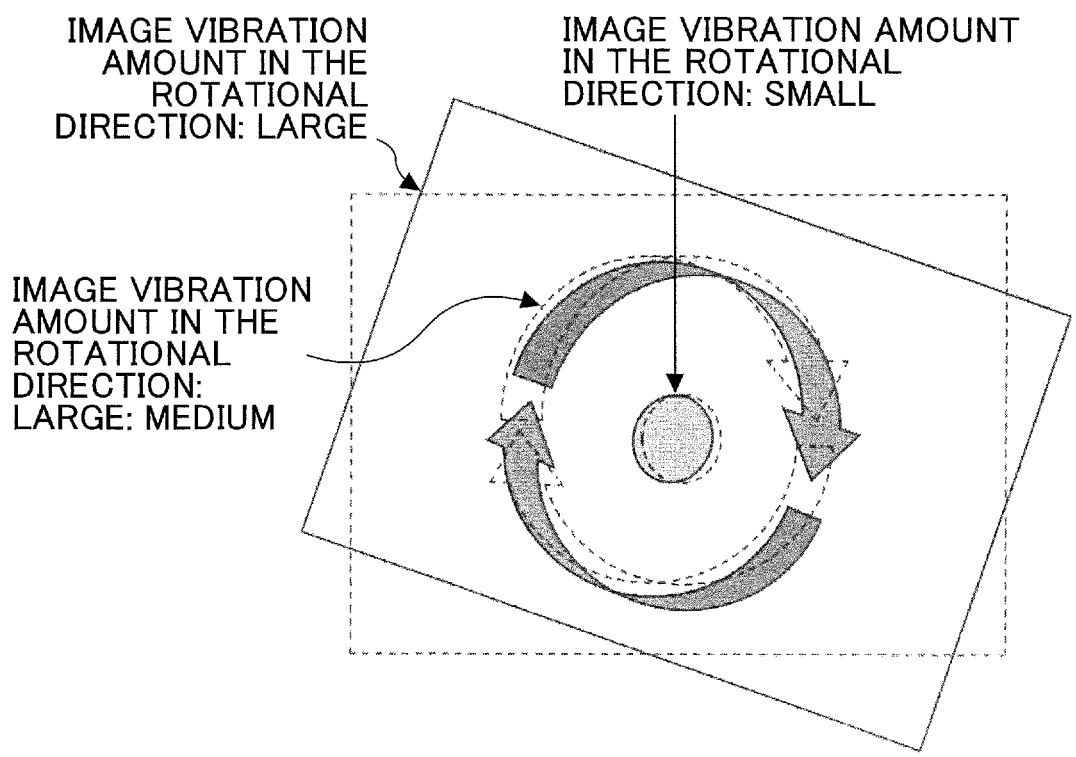

FIGS. 22A and 22B are diagrams of adverse effects of image blur (shift, vibration) in the rotational direction within the XY plane. As illustrated in FIGS. 22A and 22B, the image blur amount in the rotational direction within the XY plane decreases with a reduction in distance to the optical axis O (Z-axis) (closer to the center of the image), and increases with an increase in distance to the optical axis O (Z-axis) (closer to the periphery of the image).

In the embodiments of the present disclosure, not only the shift amount in the parallel direction within a plane (the XY plane) orthogonal to the optical axis O (Z axis) but also the shift amount in the rotational direction within the plane orthogonal to the optical axis O (Z axis) (the XY plane) is corrected using the vibration-proof unit 80. With such a configuration, the accuracy of the image calculation can be increased and the image quality of the multi-shot composite can be improved as well. Further, the processing load and the processing time of the image calculation can be reduced.

In some embodiments, the vibration-proof unit (drive device) 80 may relatively reduce the drive component (drive amount) of the drive member (image sensor) in the parallel direction within a plane (XY plane) orthogonal to the optical axis O (Z axis), and relatively increase the drive component (drive amount) of the drive member (image sensor) in the rotational direction within the plane (XY plane) orthogonal to the optical axis O (Z axis). This configuration permits a certain amount of parallel-direction shift components (shift amount) of the driving member (image sensor) to remain in the XY image, which has a small adverse effect on the image quality of the multi-shot composite. Further, such a configuration positively eliminates the rotational-direction shift components (shift amount) of the driving member (image sensor) to prevent a significant adverse effect on the image quality to increase the image quality of the multi-shot composite.

Further, as in the second embodiment, by dividing each of a plurality of images into image areas corresponding to each other by the dividing unit 26 and calculating a positional shift amount (pixel shift amount) for each image area, the shift amount of drive member (image sensor) in the rotational direction can be reduced.

In this case, the dividing unit 26 preferably divides each of a plurality of images into image areas having different sizes. More specifically, the dividing unit 26 preferably divides the center portions of each of the plurality of images preferably into image areas of relatively large sizes, and divides the peripheral portions of each of the plurality of images into image areas of relatively small sizes.

Figure 23:
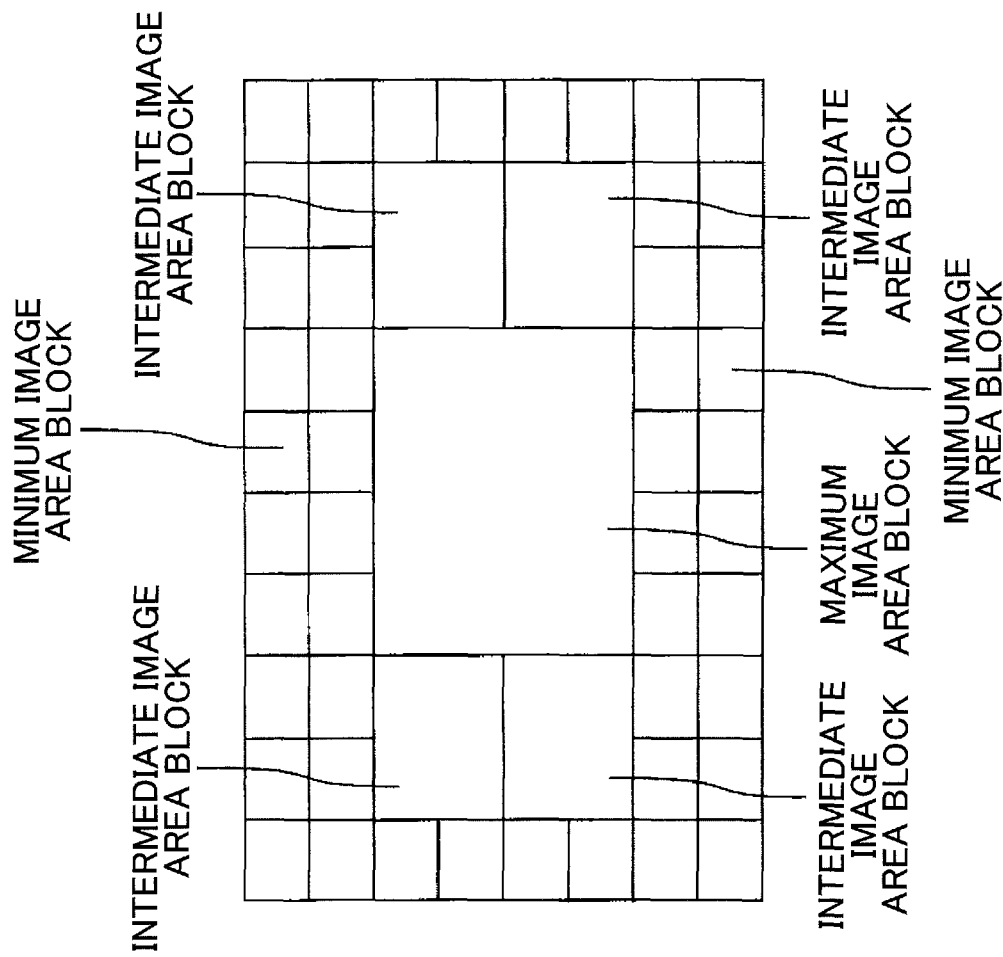
FIG. 23 is a diagram illustrating an example in which a plurality of images is divided into image areas having different sizes according to the third embodiment of the present invention.

FIG. 23 is a diagram of an example in which a plurality of images is divided into image areas having different sizes. In FIG. 23, the image area is formed by a total of 80 blocks in the minimum block unit, that is, eight blocks in the vertical direction x ten blocks in the horizontal direction. The image area in FIG. 23 is divided into a maximum image area block in the center portion of the image area, two intermediate image area blocks on each side of the maximum image area, and minimum image area blocks on the periphery of the image area, surrounding the maximum image area block and the intermediate image area blocks. The maximum image area block has a size of 16 (four-by-four pixels) minimum image area blocks (minimum block unit). The intermediate image area block has a size of 4 (two-by-two pixels) minimum image area blocks (minimum block unit).

For example, when there is a shift in the rotation direction among a plurality of images, the shift amount decreases toward the center portion of the image, and increases toward the periphery of the image (see FIGS. 22A and 22B). In view of this, the image area corresponding to the center portion of the image in which the shift amount in the rotational direction is small is divided into large (coarse) blocks, while the image area in the periphery of the image in which the shift amount in the rotational direction is large is divided into small (fine) blocks. Accordingly, the accuracy of image calculation in each image area block (particularly in the image area blocks in the periphery of the image) can be increased, and image quality of the multi-shot composite can be improved. Further, the processing load and the processing time of the image calculation can be reduced. In FIG. 23, if all the image area blocks are divided into the minimum image area blocks (minimum block units), the processing load of the image calculation and the processing time increase. Further, in FIG. 23, if all the image area blocks are divided into the maximum image area blocks, correlation between the image area blocks might not be obtained (the pixel shift amount might not be calculated) in the image peripheral portion in which the shift amount in the rotation direction is large.

According to one embodiment of the present invention, an image capturing apparatus, an image capturing method, and an image processing apparatus that are simple in structure and that can achieve excellent image quality, are provided.

The image capturing apparatus, the image capturing method, and the image processing apparatus are not limited to the specific embodiments described in the detailed description, and variations and modifications may be made without departing from the spirit and scope of the present invention.

What is claimed is:

1. An image capturing apparatus comprising:
one or more hardware processors;
one or more hardware, memories containing instructions causing the one or more hardware processors to;
acquire pieces of image data including (i) a first piece of image data acquired at a first exposure and a first position relative to an image sensor, and (ii) a second piece of image data acquired at a second exposure and a second position; the second exposure different than the first exposure: the second position shifted an odd number of pixels relative to the first position;
adjust a dynamic range of the acquired pieces of image data; and
obtain composite image data of the pieces of image data, based on a positional shift amount between the pieces of image data, and the dynamic range;
wherein the composite image data is obtained by (i) for each pixel of the composite image data, obtaining red, green, or blue first color information from the first piece of image data acquired at the first exposure and the first position, (ii) for each pixel of the composite image data, obtaining red, green, or blue second color information from the second piece of image data acquired at the second exposure and the second position, and (iii) for each pixel of the composite image data, superimposing the first color information obtained from the first piece of image data and the second color information obtained from the second piece of image data.

2. The image capturing apparatus according to claim 1, wherein the instructions cause the one or more hardware processors to adjust an overlapping amount of object luminance levels in the pieces of image data.

3. The image capturing apparatus according to claim 1, wherein the instructions cause the one or more hardware processors to:

interpolate a first pixel in the first image data, among the pieces of image data, by a second pixel in the second image data among the pieces of image data, when the first pixel is included in the first image data.

4. The image capturing apparatus according to claim 3, wherein the first pixel is a defective pixel and the second pixel is an interpolation pixel.

5. The image capturing apparatus according to claim 1, wherein the instructions cause the one or more hardware processors to:
acquire a third piece of image data at a third position shifted with respect to the first position and the second position; the third piece of image data acquired at a third exposure that is the same as the second exposure;
acquire a fourth piece of image data at a fourth position shifted with respect to the first position, the second position, and the third position; the fourth piece of image data acquired at a fourth exposure different than the first exposure, the second exposure, and the third exposure;
wherein the step of obtaining the composite image data includes (iv) for each pixel of the composite image data, obtaining red, green, or blue first color information from the third piece of image data acquired at the third exposure and the third position, (v) for each pixel of the composite image data, obtaining red, green, or blue second color information from the fourth piece of image data acquired at the fourth exposure and the fourth position, and (vi) for each pixel of the composite image data, superimposing the third color information obtained from the third piece of image data and the fourth color information obtained from the fourth piece of image data over the superimposed first color information and second color information.

6. The image capturing apparatus according to claim 5, wherein the first exposure range and the second exposure range overlap, and the second exposure range and the third exposure range overlap.

7. The image capturing apparatus according to claim 1, wherein the second position is shifted only 1, 3, or 5 pixels relative to, the first position.

8. The image capturing apparatus according to claim 1, wherein the second piece of image data is acquired by shifting a position of the imaging sensor relative to an optical axis of an imaging optical system.

9. The image capturing apparatus according to claim 1, wherein the first piece of image data and the second piece of image data are acquired by analyzing pixel shift amounts of image data generated from photographing with camera shake.

10. An image capturing, method comprising:
acquiring pieces of image data including (i) a first piece of image data acquired at a first exposure and a first position relative to an image sensor, and (ii) a second piece of image data acquired at a second exposure and a second position; the second exposure different than the first exposure; the second position shifted an odd number of pixels relative to the first position;
adjusting a dynamic range of the acquired pieces of image data; and
obtaining composite image data of the pieces of image data, based on a positional shift amount between the pieces of image data and the dynamic range;
wherein the composite image data is obtained by (i) for each pixel of the composite image data, obtaining red, green, or blue first color information from the first piece, of image data acquired at the first exposure and the first position, (ii) for each pixel of the composite image data, obtaining red, green, or blue second color information from the second piece of image data acquired at the second exposure and the second position, and (iii) for each pixel of the composite image data, superimposing the first color information obtained from the first piece of image data and the second color information obtained from the second piece of image data.

11. An image processing apparatus comprising:

one or more hardware processors;

one or more hardware memories containing instructions causing the one or more hardware processors to:

detect a positional shift amount of a plurality of pieces of image data including (i) a first piece of image data acquired at a first exposure and a first position relative to an image sensor, and (ii) a second piece of image data acquired at a second exposure and a second position; the second exposure different than the first exposure; the second position shifted an odd number of pixels, relative to the first position;

adjust a dynamic range of the plurality of pieces of image data; and obtain composite image data of the plurality of pieces of image data, based on the positional shift amount of the plurality of pieces of image data and the dynamic range;

wherein the composite image data is obtained by (i) for each pixel of the composite image data, obtaining red, green, or blue first color information from the first piece of image data acquired at the first exposure and the first position, (ii) for each pixel of the composite image data, obtaining red, green, or blue second color information from the second piece of image data acquired at the second exposure and the second position, and (iii) for each pixel of the composite image data, superimposing the first color information obtained from the first piece of image data and the second color information obtained from the second piece of image data.

* * * * *